US009972067B2

(12) United States Patent
Kwon et al.

(10) Patent No.: US 9,972,067 B2
(45) Date of Patent: May 15, 2018

(54) SYSTEM AND METHOD FOR UPSAMPLING OF SPARSE POINT CLOUD FOR 3D REGISTRATION

(71) Applicant: THE BOEING COMPANY, Chicago, IL (US)

(72) Inventors: Hyukseong Kwon, Thousand Oaks, CA (US); Kyungnam Kim, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 43 days.

(21) Appl. No.: 15/290,429

(22) Filed: Oct. 11, 2016

(65) Prior Publication Data

US 2018/0101932 A1 Apr. 12, 2018

(51) Int. Cl.
*G06T 3/00* (2006.01)
*G06T 3/40* (2006.01)
(Continued)

(52) U.S. Cl.
CPC .......... *G06T 3/0068* (2013.01); *G06T 3/4007* (2013.01); *G06T 7/0051* (2013.01);
(Continued)

(58) Field of Classification Search
CPC ....... G06T 3/0068; G06T 3/4007; G06T 7/50; G06T 2207/10028; G06T 7/136;
(Continued)

(56) References Cited

U.S. PATENT DOCUMENTS 6,862,366 B2 * 3/2005 Bhattacharjya ........ G06K 9/346
382/164

7,271,840 B2 * 9/2007 Segman ............... H04N 7/0112
348/441
(Continued)

OTHER PUBLICATIONS

Wang, et al. "A New Upsampling Method for Mobile LiDAR Data"; IEEE Publications; IEEE Workshop on Applications of Computer Vision—(WACV), pp. 17-24. 2012; DOI: 10.1109/WACV.2012.6162998.
Park, et al. "High Quality Depth Map Upsampling and Completion for RGB-D Cameras"; IEEE Journals & Magazines; IEEE Transactions on Image Processing; vol. 23, Issue 12, pp. 5559-5572; 2014. DOI: 10.1109/TIP.2014.2361034.
(Continued)

*Primary Examiner* — Brenda Bernardi
(74) *Attorney, Agent, or Firm* — Perman & Green, LLP

(57) ABSTRACT

A method for three-dimensional point cloud registration includes generating a first upsampled three-dimensional point cloud by identifying at least one missing point in the three-dimensional point cloud, determining an intensity of neighboring pixels, filling the at least one missing point in the three-dimensional point cloud with a filler point using depth information from depth values in the three-dimensional point cloud that correspond with the neighboring pixels, generating a second upsampled three-dimensional point cloud by determining at least one local area of the first upsampled three-dimensional point cloud, determining entropies of pixels in the two-dimensional image that correspond with the at least one local area, adding at least one point to the at least one local area based on the entropies of pixels in the two-dimensional image and a scaled entropy threshold, and registering the second upsampled three-dimensional point cloud with a predetermined three-dimensional model.

20 Claims, 14 Drawing Sheets

(51) Int. Cl.
*G06T 7/50* (2017.01)
*G06T 7/00* (2017.01)

(52) U.S. Cl.
CPC ............ *G06T 2207/10028* (2013.01); *G06T 2207/20148* (2013.01)

(58) Field of Classification Search
CPC ... G06T 17/00; G06T 3/40; G06T 7/00; G01S 17/89; G01S 17/42
See application file for complete search history.

(56) References Cited

U.S. PATENT DOCUMENTS

| | | | | |
|---|---|---|---|---|
| 9,449,227 | B2* | 9/2016 | Chen | G06K 9/0063 |
| 2007/0031064 | A1* | 2/2007 | Zhao | G06K 9/00214 |
| | | | | 382/285 |
| 2013/0106849 | A1* | 5/2013 | Ha | G06T 5/005 |
| | | | | 345/420 |
| 2014/0132733 | A1 | 5/2014 | Mundhenk et al. | |
| 2014/0376821 | A1* | 12/2014 | Meir | G01S 17/50 |
| | | | | 382/218 |
| 2015/0254857 | A1* | 9/2015 | Huang | G06F 19/3406 |
| | | | | 382/154 |
| 2016/0097858 | A1 | 4/2016 | Mundhenk et al. | |

OTHER PUBLICATIONS

Wong, et al. "Camera and LIDAR Fusion for Mapping of Actively Illuminated Subterranean Voids"; Springer Berlin Heidelberg; Field and Service Robotics: Results of the 7th International Conference: Part 9; Springer Tracts in Advanced Robotics Series; vol. 62; pp. 421-430; 2010; DOI: 10.1007/978-3-642-13408-1_38.

Mundhenk, et al. "Frame Rate Fusion and Upsampling of EO/LIDAR Data for Multiple Platforms"; IEEE Conference Publications; IEEE Conference on Computer Vision and Pattern Recognition Workshops; pp. 762-769; 2014; DOI: 10.1109/CVPRW.2014.117.

Rusinkiewicz, et al. "Efficient Variants of the ICP Algorithm"; IEEE Conference Publications; Proceedings of the Third International 3-D Digital Imaging and Modeling, pp. 145-152; 2001; DOI: 10.1109/IM.2001.924423.

* cited by examiner

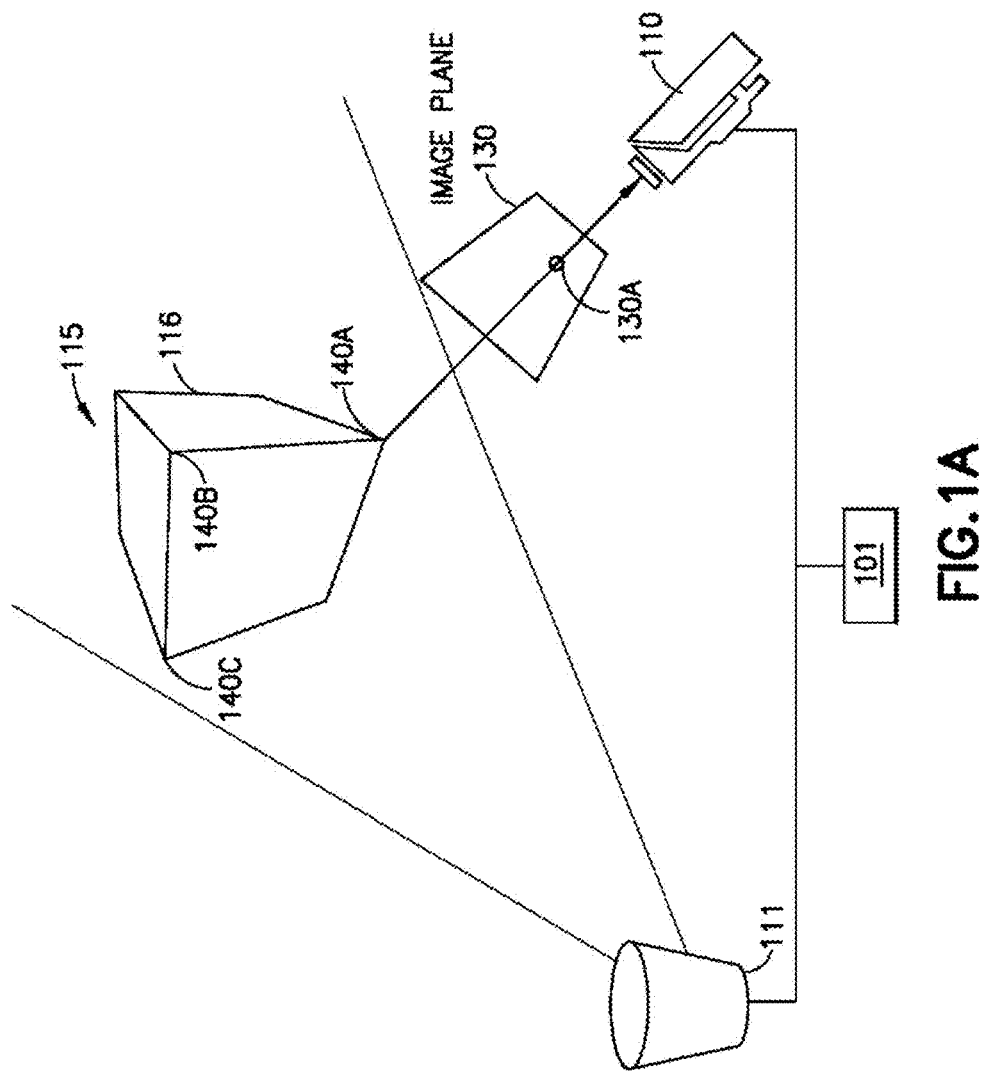

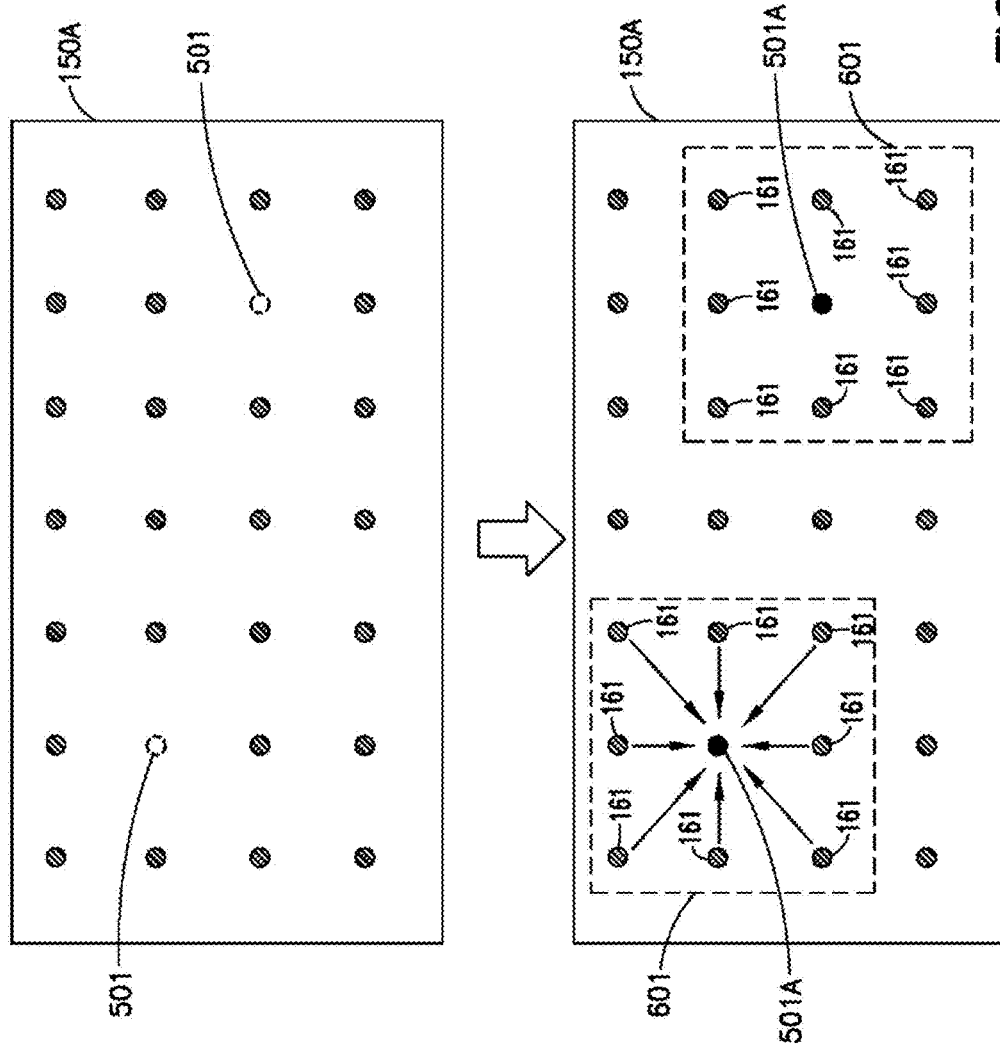

SYSTEM AND METHOD FOR UPSAMPLING OF SPARSE POINT CLOUD FOR 3D REGISTRATION

FIELD

The aspects of exemplary embodiment generally relate to improving three dimensional (3D) registration, more particularly, to improving 3D registration by upsampling a low resolution point cloud (where the term "low resolution" is compared to the upsampled resolution).

BACKGROUND

Point clouds are collections of points in a three dimensional system that describe a 3D scene or a 3D object. Each point in the point cloud represents XYZ coordinates within a 3D coordinate system. Typically, the points within a point cloud represent the exterior surfaces of a 3D object. Point clouds are typically generated by a 3D scanning technology such as, for example, light detection and ranging (LIDAR) systems. However, point clouds can also be generated by other 3D scanning technologies including, for example, depth sensors, structured-light depth cameras (which can detect depth and 3D shapes based on projected light patterns), laser triangulation sensors, or through photogrammetric techniques (e.g. constructing a 3D point cloud based on measurements of a scene or object from multiple angles).

In conventional 3D scanning and registration systems, 3D scanner technologies are sometimes paired with two dimensional (2D) electro-optical systems (e.g. two dimensional camera sensors). The combination of 3D scanner technologies with 2D electro-optical systems provides for synergistic uses with many applications such as, for example, surveillance, robotics, video games, environmental modeling, aerospace flight and/or proximity detection. The 2D electro-optical systems and 3D scanner systems also have their respective characteristics and advantages which can improve a 3D point cloud generated by the 3D scanner. For example, 2D electro-optical systems typically have a higher resolution than a point cloud generated by a 3D scanner (such as, for example, a LIDAR sensor). Further, the 3D upsampling of 3D scanner data using 2D electro-optical information can provide for more detailed point clouds with higher point cloud density (e.g. a higher point cloud resolution).

In conventional systems, upsampling of 3D point clouds with 2D electro-optical data from 2D electro-optical sensors includes using multi-resolution depth maps based on visibility analysis to perform more accurate upsampling while removing outlier points within the 3D point cloud. This conventional upsampling system performs best with simple 3D structures like tall buildings, but often fails to accurately upsample point clouds with more complex and more irregularly shaped objects such as, for example, foliage or trees. Other conventional systems include using high-quality depth map upsampling methods to obtain cleaner edges between objects. High-quality depth map upsampling provides for obtaining edge discontinuities based on heuristic weighting factors that use only the global structure of objects. Other conventional systems employ high dynamic range cameras in an electro-optical/3D scanner upsampling fusion, which is helpful in environments with poor lighting (e.g., using high dynamic range cameras to compensate for light blowouts in bright environments and black-crush in darker environments), while employing a time-consuming Markov Random Field framework for sharper shape reconstruction from illumination. Yet other conventional systems include a depth point cloud upsampling method that backfills sparse point cloud areas using electro-optical intensity information by iteratively fusing electro-optical pixel information with 3D scanner data by sliding backfilling windows at different scales.

Conventional electro-optical/3D scanner upsampling systems all generate upsampled 3D point clouds for better visualization characteristics. However, the conventional electro-optical/3D scanner upsampling methods often generate new 3D points in the point cloud that reduce overall 3D registration accuracy by presenting greater chances of introducing or generating outlier points. Further, conventional electro-optical/3D scanner upsampling systems are typically computationally expensive and not suited for real-time operations such as, for example, space rendezvous, space docking systems, or proximity maneuvering.

SUMMARY

Accordingly, a system and method, intended to address one or more of the above-identified (or other) concerns, would find utility.

In accordance with one or more aspects of the present disclosure, a method for three-dimensional point cloud registration includes generating, with a processor, a three-dimensional point cloud of a scanned object using data received from a three-dimensional imaging sensor and storing the three-dimensional point cloud in a first memory location, generating, with the processor, a two-dimensional image of the scanned object using data received from a two-dimensional imaging sensor and storing the two-dimensional image in a second memory location, comparing the three-dimensional point cloud and the two-dimensional image, with the processor, and aligning the three-dimensional point cloud with the two-dimensional image according to at least three common points that are common to both the three-dimensional point cloud and the two-dimensional image, generating, with the processor, a first upsampled three-dimensional point cloud by identifying, with the processor, at least one missing point in the three-dimensional point cloud, determining, with the processor, an intensity of neighboring pixels in the two-dimensional image neighboring the at least one missing point in the three-dimensional point cloud, and filling, with the processor, the at least one missing point in the three-dimensional point cloud with a filler point using depth information from depth values in the three-dimensional point cloud that correspond with the neighboring pixels in the two-dimensional image where the neighboring pixels have intensities that correspond with an intensity of a point in the two-dimensional image associated with a respective missing point in the three-dimensional point cloud, generating, with the processor, a second upsampled three-dimensional point cloud by determining, with the processor, at least one local area of the first upsampled three-dimensional point cloud, determining, with the processor, entropies of pixels in the two-dimensional image that correspond with the at least one local area of the first upsampled three-dimensional point cloud, and adding, with the processor, at least one point to the at least one local area of the first upsampled three-dimensional point cloud based on the entropies of pixels in the two-dimensional image that correspond with the at least one local area and a scaled entropy threshold, and registering, with the processor, the second upsampled three-dimensional point cloud with a predetermined three-dimensional model of the scanned object.

In accordance with one or more aspects of the present disclosure, an apparatus for three-dimensional point cloud registration including a three-dimensional imaging sensor, a two-dimensional imaging sensor, and a processor connected to both the three-dimensional sensor and the two-dimensional sensor, the processor being configured to generate a three-dimensional point cloud of a scanned object using data received from the three-dimensional imaging sensor and store the three-dimensional point cloud in a first memory location, generate a two-dimensional image of the scanned object using data received from the two-dimensional imaging sensor and store the two-dimensional image in a second memory location, compare the three-dimensional point cloud and the two-dimensional image and align the three-dimensional point cloud with the two-dimensional image according to at least one common point that is common to both the three-dimensional point cloud and the two-dimensional image, generate a first upsampled three-dimensional point cloud by identifying at least one missing point in the three-dimensional point cloud, determining an intensity of neighboring pixels in the two-dimensional image neighboring the at least one missing point in the three-dimensional point cloud, and filling the at least one missing point in the three-dimensional point cloud with a filler point using depth information from depth values in the three-dimensional point cloud that correspond with the neighboring pixels in the two-dimensional image where the neighboring pixels have intensities that correspond with an intensity of a point in the two-dimensional image associated with a respective missing point in the three-dimensional point cloud, generate a second upsampled three-dimensional point cloud by determining at least one local area of the first upsampled three-dimensional point cloud, determining entropies of pixels in the two-dimensional image that correspond with the at least one local area of the first upsampled three-dimensional point cloud, and adding at least one point to the at least one local area of the first upsampled three-dimensional point cloud based on the entropies of pixels in the two-dimensional image that correspond with the at least one local area and a scaled entropy threshold, and register the second upsampled three-dimensional point cloud with a predetermined three-dimensional model of the scanned object.

In accordance with one or more aspects of the present disclosure, a non-transitory computer readable medium with instructions stored thereon, that when executed by a processor, are operable for performing a method for three-dimensional point cloud registration includes generating a three-dimensional point cloud of a scanned object using data received from a three-dimensional imaging sensor and storing the three-dimensional point cloud in a first memory location, generating a two-dimensional image of the scanned object using data received from a two-dimensional imaging sensor and storing the two-dimensional image in a second memory location, comparing the three-dimensional point cloud and the two-dimensional image and aligning the three-dimensional point cloud with the two-dimensional image according to at least one common point that is common to both the three-dimensional point cloud and the two-dimensional image, generating a first upsampled three-dimensional point cloud by identifying, with the processor, at least one missing point in the three-dimensional point cloud, determining, with the processor, an intensity of neighboring pixels in the two-dimensional image neighboring the at least one missing point in the three-dimensional point cloud, and filling, with the processor, the at least one missing point in the three-dimensional point cloud with a filler point using depth information from depth values in the three-dimensional point cloud that correspond with the neighboring pixels in the two-dimensional image where the neighboring pixels have intensities that correspond with an intensity of a point in the two-dimensional image associated with a respective missing point in the three-dimensional point cloud, generating a second upsampled three-dimensional point cloud by determining, with the processor, at least one local area of the first upsampled three-dimensional point cloud, determining, with the processor, entropies of pixels in the two-dimensional image that correspond with the at least one local area of the first upsampled three-dimensional point cloud, and adding, with the processor, at least one point to the at least one local area of the first upsampled three-dimensional point cloud based on the entropies of pixels in the two-dimensional image that correspond with the at least one local area and a scaled entropy threshold, and registering the second upsampled three-dimensional point cloud with a predetermined three-dimensional model of the scanned object.

BRIEF DESCRIPTION OF THE DRAWINGS

Figure 1:
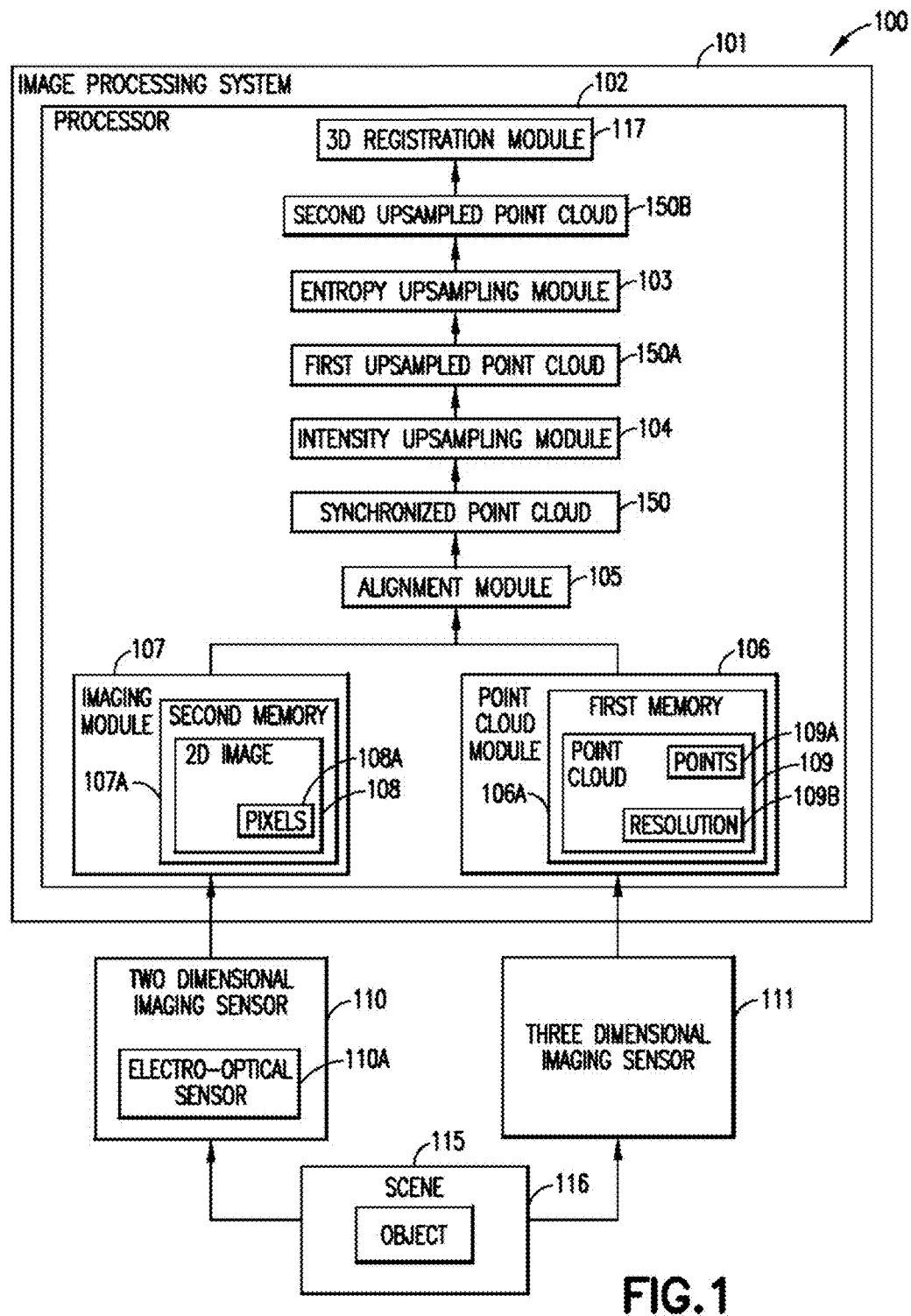
Figure 2:
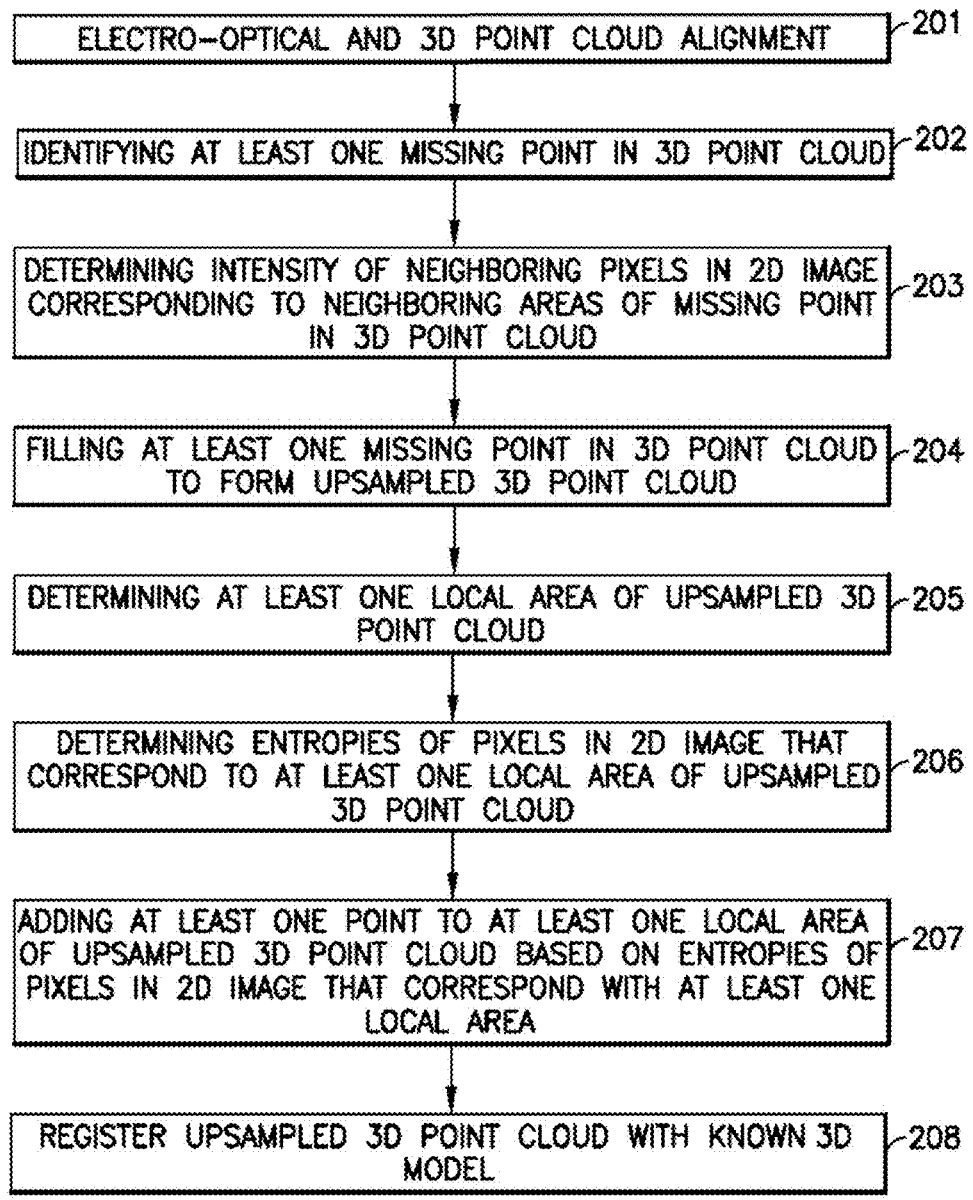
Figure 3:
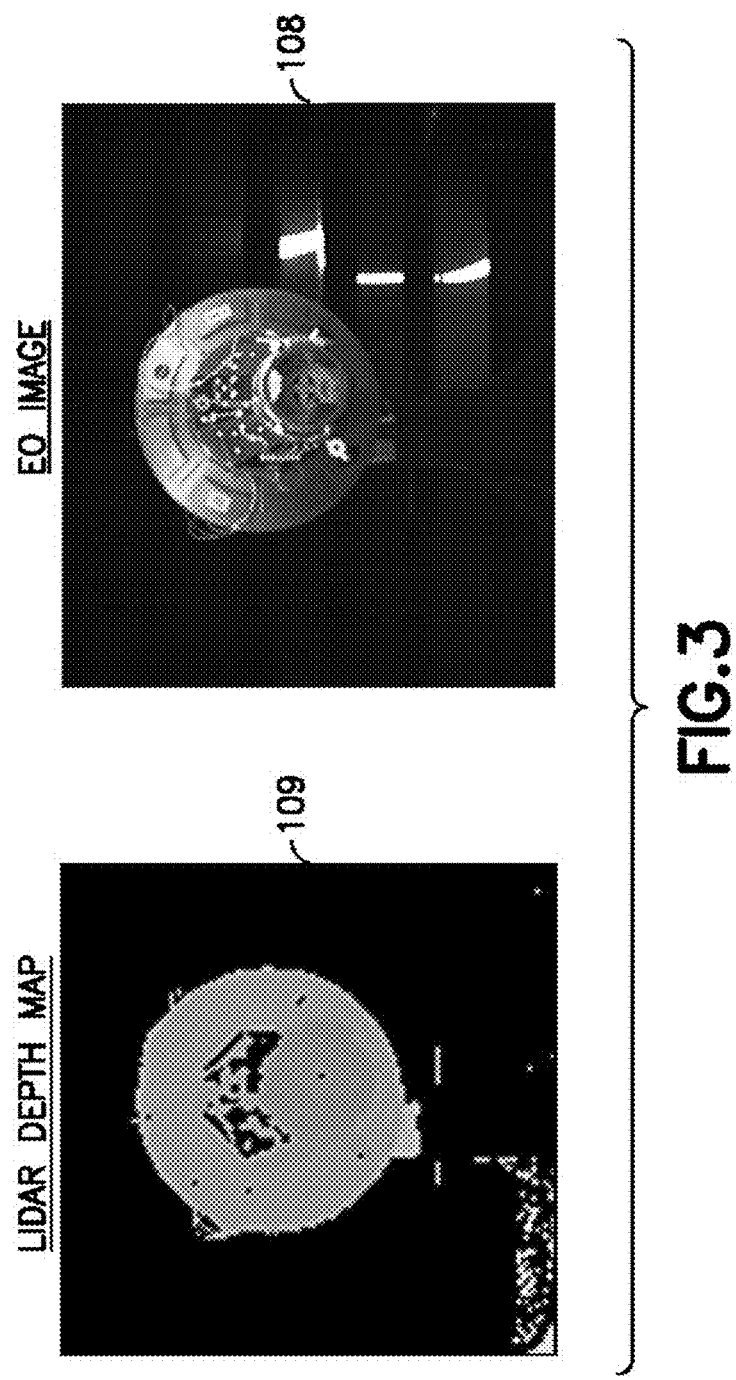
Figure 4:
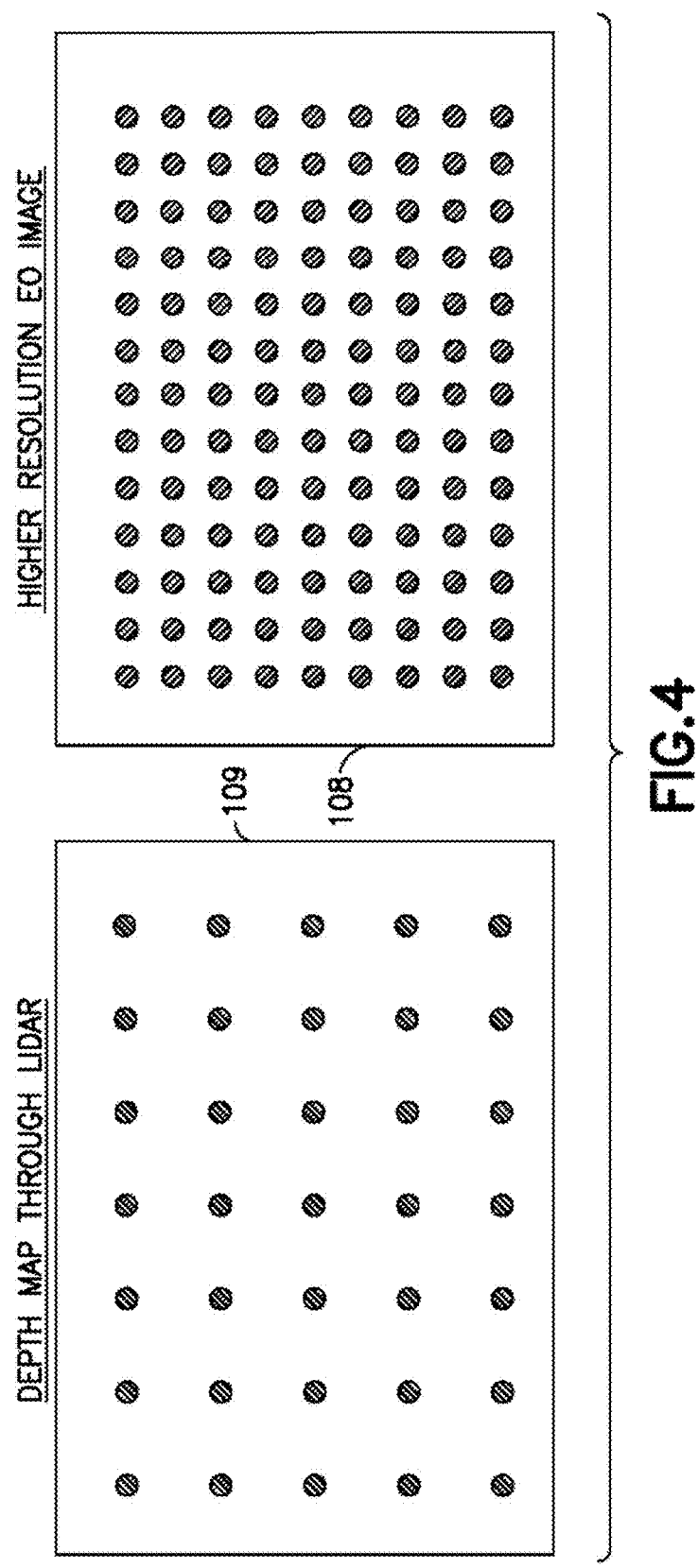
Figure 5:
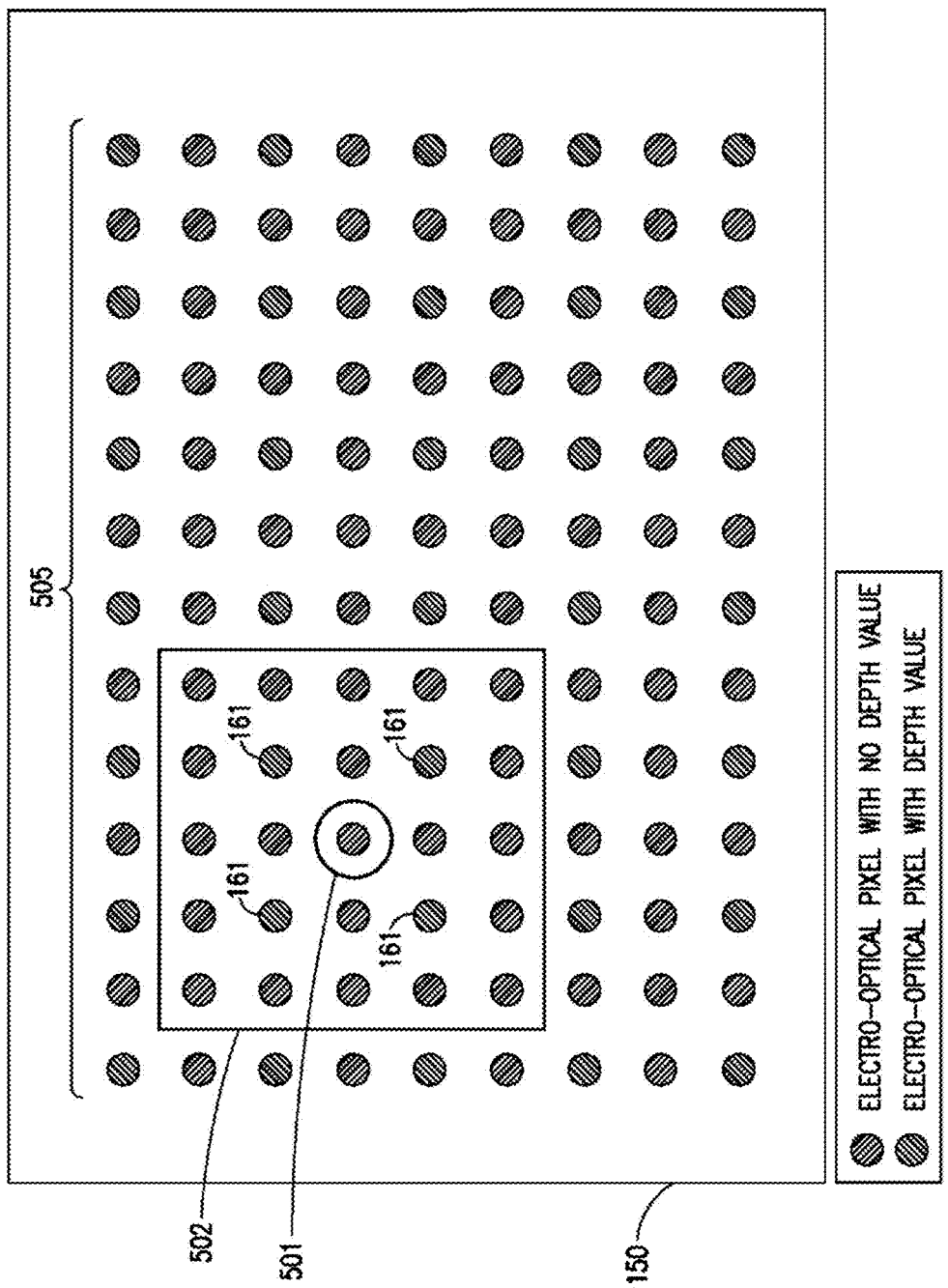
Figure 5A:
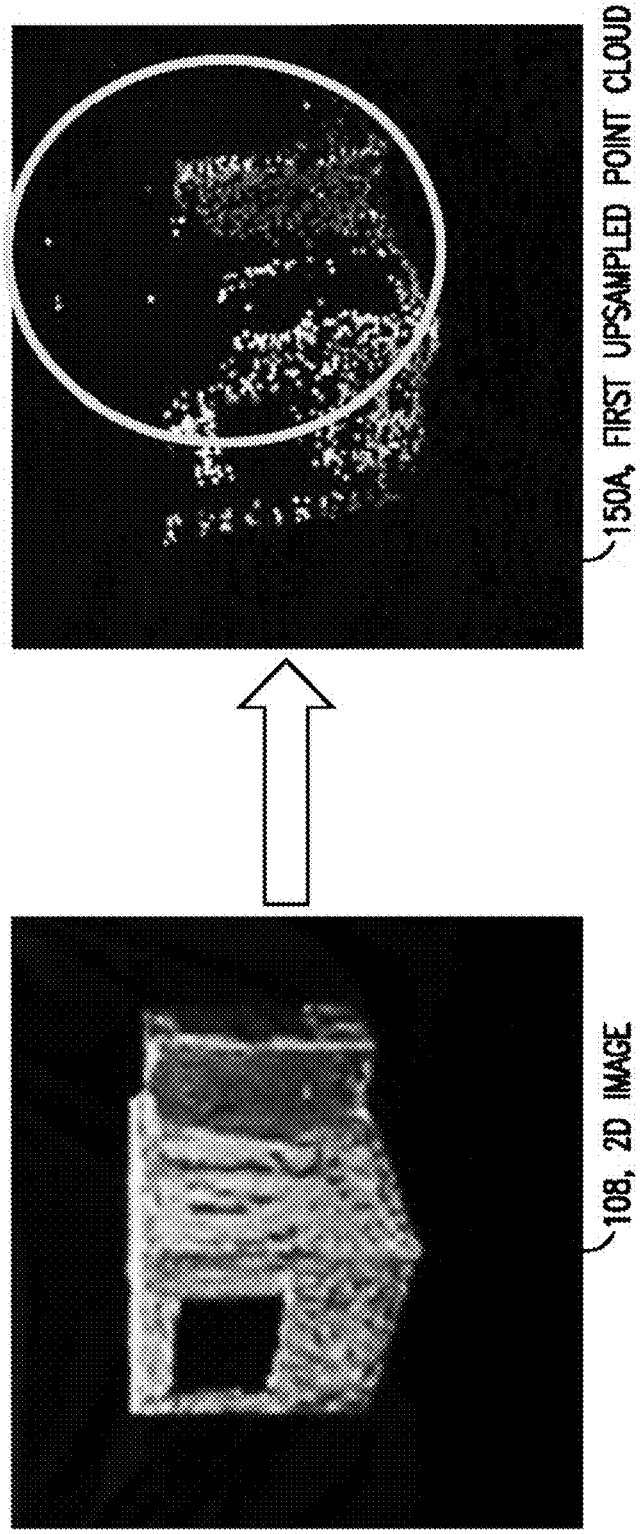
Figure 7:
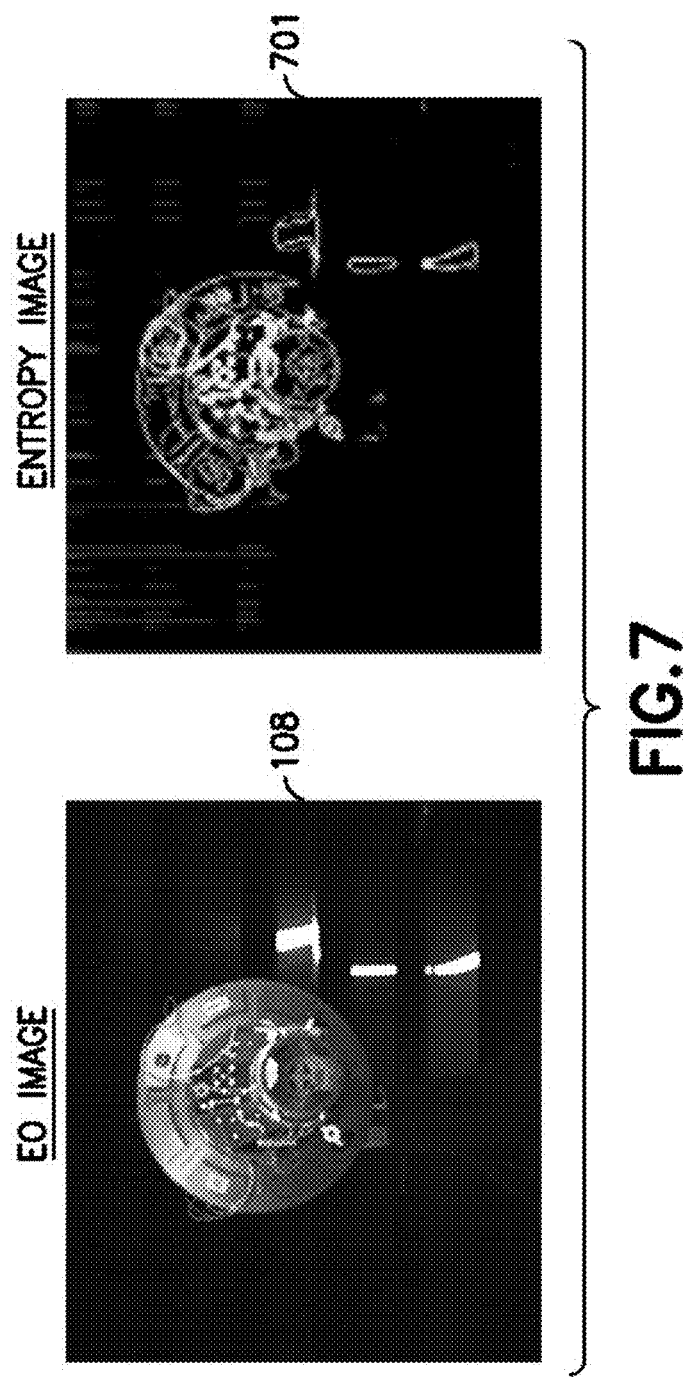
Figure 8:
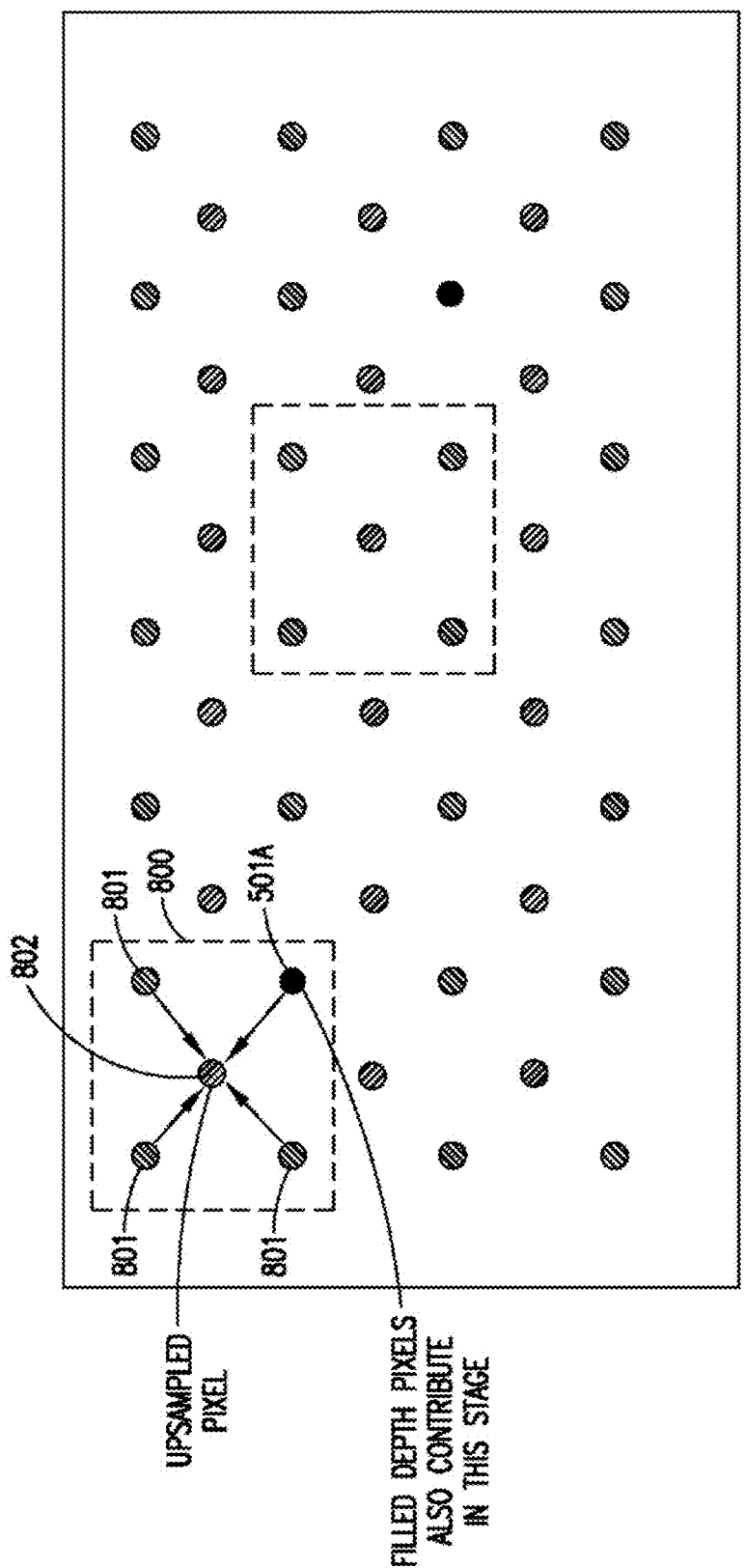
Figure 9:
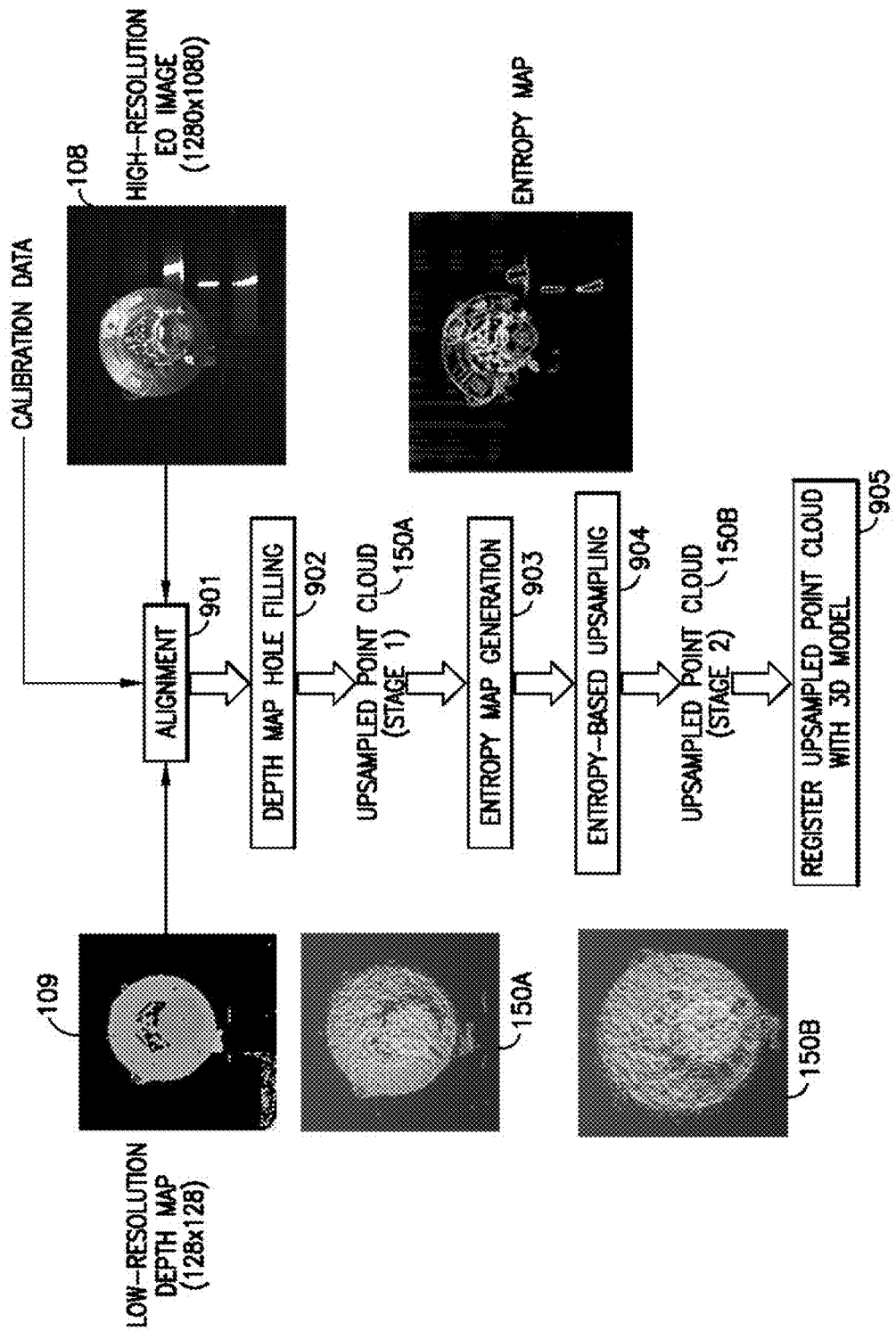
Figure 10:
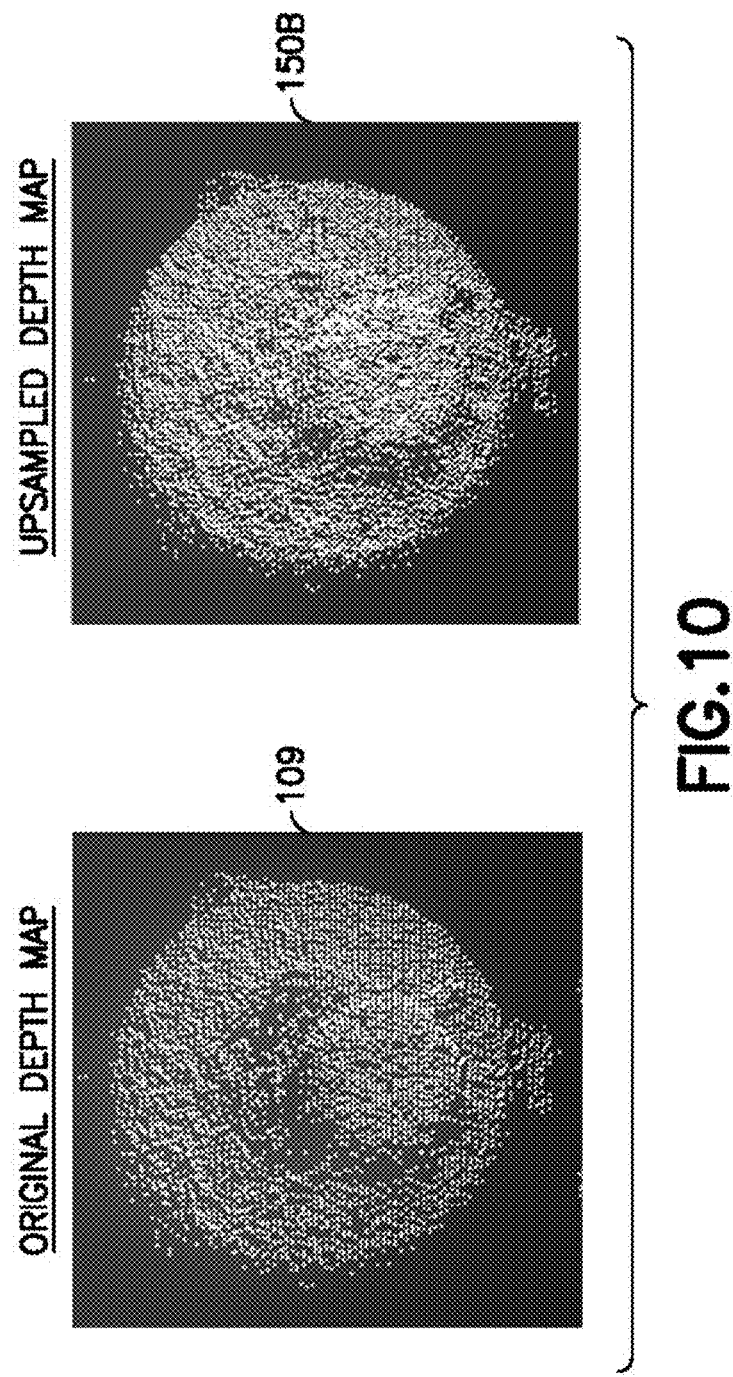
Figure 11:
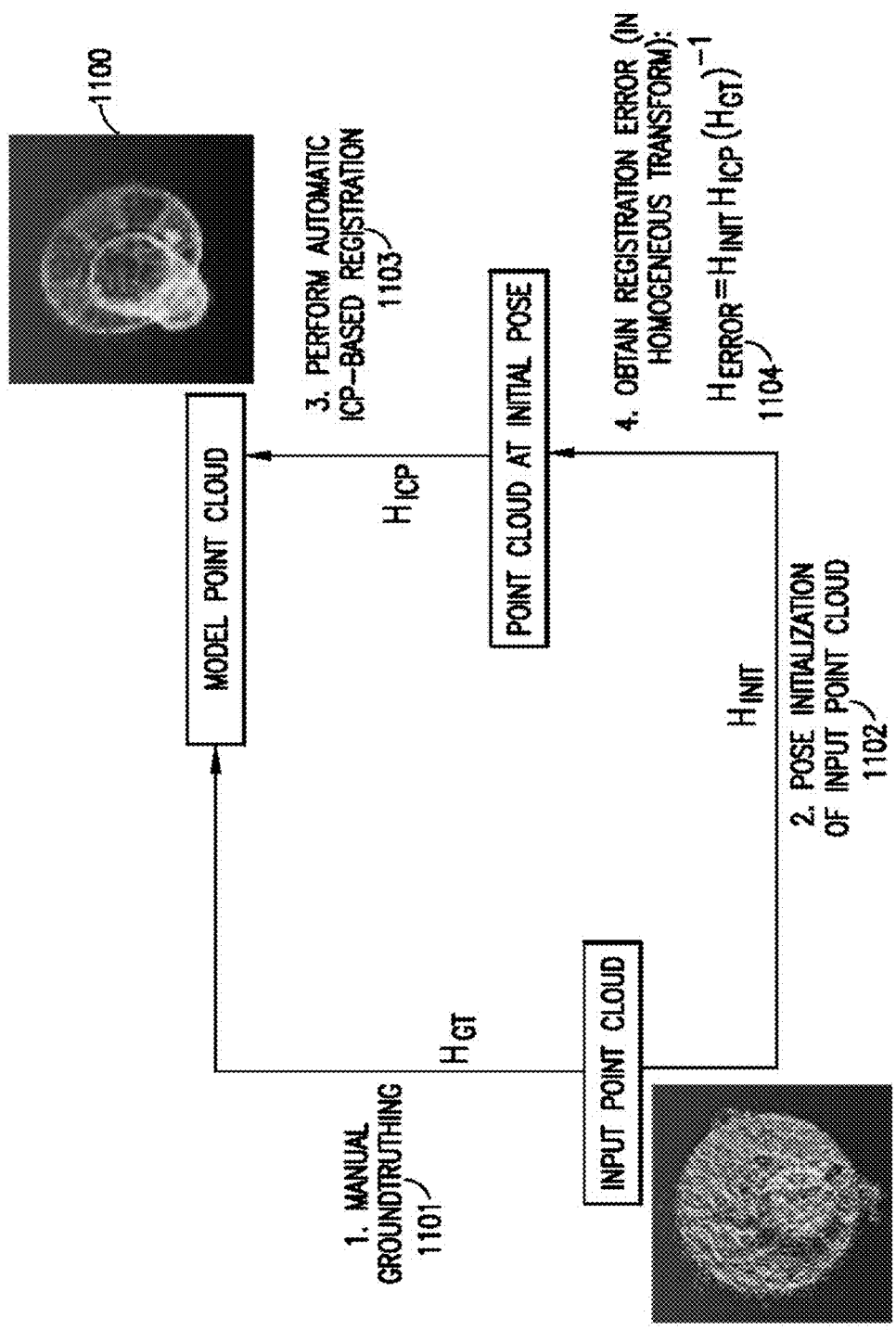
Figure 12:
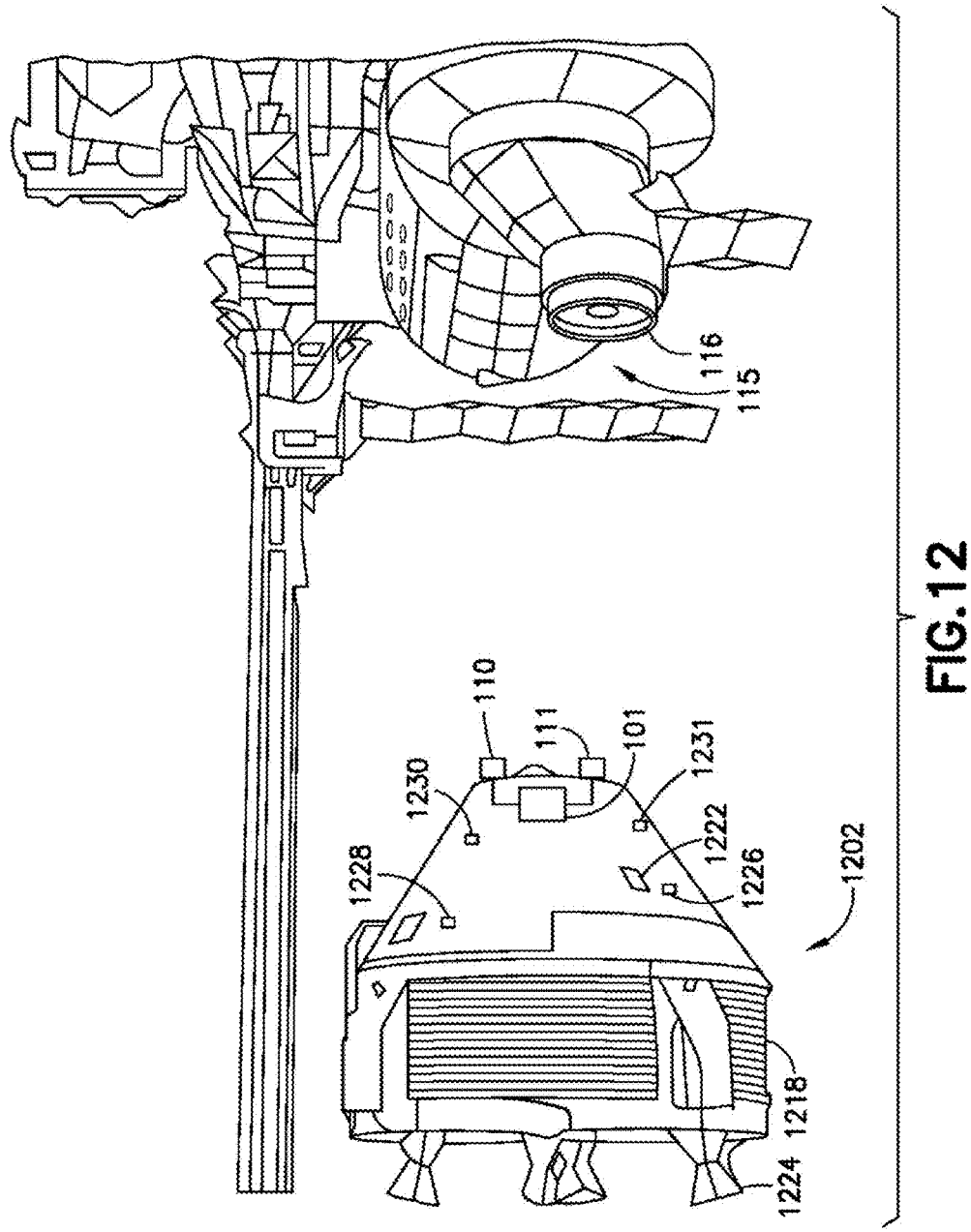

Having thus described examples of the disclosure in general terms, reference will now be made to the accompanying drawings, which are not necessarily drawn to scale, and wherein like reference characters designate the same or similar parts throughout the several views, and wherein:

FIG. 1 is an exemplary block diagram of a 3D registration system according to aspects of the present disclosure;

FIG. 1A is an exemplary diagram illustrating the 3D registration system according to aspects of the present disclosure;

FIG. 2 is an exemplary flow diagram of the operation of the 3D registration system according to aspects of the present disclosure;

FIG. 3 is an exemplary diagram illustrating a point cloud and an electro-optical image according to aspects of the present disclosure;

FIG. 4 is an exemplary diagram illustrating the resolution differences between the 3D point cloud and the electro-optical image according to aspects of the present disclosure;

FIG. 5 is an exemplary diagram illustrating a point cloud according to aspects of the present disclosure;

FIG. 5A is an exemplary diagram illustrating an electro-optical image and gaps within an upsampled point cloud according to aspects of the present disclosure;

FIG. 6 is an exemplary diagram illustrating an upsampling operation according to aspects of the present disclosure;

FIG. 7 is an exemplary diagram illustrating an entropy image of an electro-optical image according to aspects of the present disclosure;

FIG. 8 is an exemplary diagram illustrating an upsampling operation according to aspects of the present disclosure;

FIG. 9 is an exemplary flow diagram of the operation of a 3D registration system according to aspects of the present disclosure;

FIG. 10 is an exemplary illustration of a 3D point cloud and an upsampled 3D point cloud according to aspects of the present disclosure;

FIG. 11 is an exemplary flow diagram illustrating 3D registration error calculation according to aspects of the present disclosure;

FIG. 12 is a schematic illustration of a spacecraft according to aspects of the present disclosure.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings or connections other than those depicted in the block diagrams may also exist. Dashed lines, if any, connecting the various elements and/or components represent couplings or connections similar in function and purpose to those represented by solid lines; however, couplings or connections represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting. It is further noted that all numbers, temperatures, etc. are "about" and provided for exemplary purposes only. All specific numbers, temperatures and any other specific information may be more or less or any suitable number or temperature.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Referring to FIG. 1, aspects of the present disclosure provide for a 3D registration system 100 that upsamples 3D point clouds using a fusion of 2D electro-optical sensor data and 3D sensor data that improves upon the performance of 3D registration of an input 3D point cloud with a known 3D model. Aspects of the present disclosure further provide for a two-stage 3D point cloud upsampling process. The first stage of the 3D point cloud upsampling process is an upsampling process based on electro-optical intensity upsampling. The second stage of the 3D point cloud upsampling process is a tiered entropy upsampling process where, depending on local entropy values (e.g., low entropy, medium entropy and high entropy) of the 2D electro-optical image, a tiered entropy upsampling procedure is employed (mean upsampling, full upsampling and no upsampling, respectively). In the present disclosure, the 3D registration system 100 is configured to upsample a lower resolution 3D point cloud (e.g., the original point cloud) to a higher resolution 3D point cloud (e.g., the upsampled point cloud in which the overall point density of the original 3D point cloud is increased) as well as filling in "holes" or "gaps" within the upsampled point cloud to improve accuracy in 3D registration of the upsampled point cloud with a known 3D model.

Referring now to FIGS. 1, 1A and FIG. 2, exemplary block diagrams of the 3D registration system 100 and an exemplary flow diagram illustrating the operations of the 3D registration system 100 are shown. The 3D registration system 100 includes an image processing system 101, a 2D imaging sensor 110 and a 3D imaging sensor 111. Both the 2D imaging sensor 110 and the 3D imaging sensor 111 are configured to image and measure a scene 115 and an object 116 within the scene 115. In one aspect, the image processing system 101 also includes a processor 102. The processor 102 further includes an imaging module 107 and a point cloud module 106, which receive input from the two dimensional (2D) imaging sensor 110 and the three dimensional (3D) imaging sensor 111, respectively. The processor 102 also includes an alignment module 105, an intensity upsampling module 104, an entropy upsampling module 103 and a 3D registration module 117. In one aspect, the modules described herein are any separable component or hardware unit configured to perform a predetermined function as described herein. In one aspect, the modules described herein are hardware components which are physically part of the processor 102 and configured to perform a predetermined procedure. In other aspects, it is understood that the modules described herein are distinct and identifiable, non-transitory computer readable medium or computer software units that are executed by the processor 102 and configured to perform a predetermined procedure. It should also be understood that this is one exemplary aspect of the 3D registration system 100. In other aspects, the 3D registration system 100 can have any suitable configuration and components.

In one aspect, the two dimensional imaging sensor 110 includes an electro-optical sensor 110A that is configured to capture an image of the object 116 within the scene 115 through an image plane 130. In one aspect, the electro-optical sensor 110A is a 2D imaging sensor configured to detect the scene 115 and the object 116 and capture the light reflected from one or more of the scene and object 116 as a two dimensional electro-optical bitmap image. In one aspect, the electro-optical sensor 110A is any suitable sensor such as, e.g., a complementary metal-oxide semiconductor (CMOS) sensor or a charge-coupled device (CCD) sensor. In one aspect, the electro-optical sensor 110A also includes other features such as, for example, the ability to capture high dynamic range images which capture a greater dynamic range of luminance of an electro-optical image. In yet other aspects, the electro-optical sensor 110A is also configured to capture images in the nonvisible electromagnetic spectrum such as, for example, infrared light or ultraviolet light.

The 3D registration system 100 also includes a 3D imaging sensor 111 configured to capture a 3D point cloud of the scene 115 and object 116. In one aspect, the 3D imaging sensor 111 is a LIDAR sensor as described herein. In other aspects, the 3D imaging sensor 111 is any suitable 3D sensor, including, for example, depth sensors, structured-light depth cameras, laser triangulation sensors, or multiple 2D sensors working in concert to produce a 3D point cloud using any suitable photogrammetric techniques.

In one aspect, the 3D registration system 100 includes the point cloud module 106 of the processor 102, which is communicably connected to the 3D imaging sensor 111, and the imaging module 107 of the processor 102, which is communicably connected to the 2D imaging sensor 110. In one aspect, the point cloud module 106 of the processor 102 is configured to generate a 3D point cloud 109, comprising of a matrix of points 109A having depth values and having a resolution 109B based on the data received from the 3D imaging sensor 111, of the scanned object 116 within the scene 115. In one aspect, the 3D point cloud 109 is stored in a first memory location 106A and comprises a depth map of the object 116 and the scene 115. Similarly, in one aspect, the imaging module 107 is configured to generate the 2D image 108 based on electro-optical data from the 2D imaging sensor 110. The 2D image 108 is stored in a second memory location 107A and comprises a matrix of pixels 108A defining the bitmap of the 2D image 108.

In one aspect, the alignment module 105 of the processor 102 is configured to receive the 3D point cloud 109 of the scanned object 116 and the scene 115 as well as the 2D image 108 to form a synchronized point cloud 150. In one aspect, the alignment module 105 is configured to compare the 3D point cloud 109 and the 2D image 108 and synchronize or align the 3D point cloud 109 with the 2D image 108 according to two or more common points that are common to both the 3D point cloud 109 and 2D image 108 (see block 201 of FIG. 2). In one aspect, as noted, the 2D image 108 is typically of a higher resolution than the 3D point cloud 109. Referring briefly to FIGS. 3 and 4, examples of the comparative resolution between the 3D point cloud 109 (e.g., the depth map of the object 116 and the scene 115) and the corresponding 2D image 108 are shown. As can be seen in FIG. 4, there is a resolution difference between 2D image 108 and the 3D point cloud 109, where the 2D image 108 has greater resolution relative to that of the 3D point cloud 109 (represented by the greater comparative density of points shown in FIG. 4).

Referring still to FIGS. 1 and 1A, in one aspect, in order to synchronize or align the 3D point cloud 109 with the 2D image 108 with the alignment module 105, a calibration procedure between the 3D point cloud 109 and the 2D image 108 is performed by the alignment module 105 to determine the relative poses of the 3D point cloud 109 and the 2D image 108. In one aspect, the alignment module 105 is configured to determine a feature point 140A within the 3D point cloud 109 as well as a corresponding pixel location 130A in the image plane 130 of the 2D image 108 which corresponds to the feature point 140A as shown in FIG. 1A. As can be seen, the feature point 140A corresponds to the pixel location 130A on the image plane 130 (e.g., the two dimensional projection of a 3D scene onto a two dimensional image captured by the 2D imaging sensor 110) captured by the 2D imaging system 110. In one aspect, the alignment module 105 is also configured to determine a predetermined number of feature points 140A-C (or common points) in the 3D point cloud and the corresponding pixel locations to each respective feature points 140A-C on the image plane 130 of the 2D image 108 captured by the 2D imaging sensor 110. For the purposes of this application, two or more pairs of feature points 140A-C in the 3D point cloud 109 and corresponding pixel locations on the image plane 130 are determined by the alignment module 105. Since each of the feature points 140A-C in the 3D point cloud 109 (e.g., the depth map) provide a 3D location (e.g., provides a depth value of the point), the 3D point cloud 109 provides the alignment module 105 with the depth value or 3D location information for each of the corresponding pixels to the feature points 140A-C on the image plane 130.

In one aspect, once the relative poses of the 3D imaging sensor 111 and the 2D imaging sensor 110 are determined by the alignment module 105 (based on the pairs of feature points 140A-C and the corresponding pixel locations within the 2D image 108), the alignment between the 3D point cloud 109 and the 2D image 108 can be determined by using the following equation:

$$\begin{bmatrix} X \\ Y \\ Z \\ 1 \end{bmatrix} = M \begin{bmatrix} x \\ y \\ 1 \end{bmatrix} = \begin{bmatrix} m_{11} & m_{12} & m_{13} \\ m_{21} & m_{22} & m_{23} \\ m_{31} & m_{32} & m_{33} \\ m_{41} & m_{42} & m_{34} \end{bmatrix} \begin{bmatrix} x \\ y \\ 1 \end{bmatrix}$$

Where [X Y Z] is a 3D coordinate of the feature point 140A-C of the object 116 in the 3D coordinate system of the 3D point cloud 109 and [x y] is the corresponding pixel location located on the 2D image 108 and M is the calibration matrix to be obtained or estimated.

In one aspect, by using multiple correspondences of the feature point 140A-C and their respective corresponding pixel locations located on the 2D image 108, the following relation can be obtained:

$$2b = AM = A \begin{bmatrix} m_{11} \\ m_{12} \\ m_{13} \\ m_{21} \\ m_{22} \\ m_{23} \\ m_{31} \\ m_{32} \\ m_{33} \\ m_{41} \\ m_{42} \\ m_{43} \end{bmatrix}$$

Where A is a 3 k×12 matrix and b is a 3 k×1 vector from k 3D points. The calibration matrix M can then be obtained or estimated through the equation $M=(A^T A)^T A^T b$.

In one aspect, based on the acquired calibration matrix, the alignment module 105 can determine the correspondences between each point 109A in the 3D point cloud 109 and the corresponding electro-optical pixels 108A in the 2D image 108 for synchronization and alignment.

In one aspect, after the alignment module 105 determines the correspondences between the 2D image 108 and the 3D point cloud 109, the alignment module 105 is further configured to synchronize the 2D image 108 and the 3D point cloud 109 according to the calibration matrix M determined above and assign pixels 108A within the 2D image 108 with a depth value based on the corresponding point within the 3D point cloud 109 (see block 201 of FIG. 2). In one aspect, the alignment of the 2D image 108 and the 3D point cloud 109 by the alignment module 105 results in a synchronized point cloud 150 (see for example, FIG. 5) that includes fused 3D and 2D imaging sensor data and encompasses the assignment of a depth value for each of the electro-optical pixels of the 2D image 108 based on the corresponding point within the 3D point cloud 109. In one aspect, it should be understood that the alignment module 105 is a discrete module connected to or is a part of the processor 102. However, in other aspects, it should be understood that the alignment module 105 is a distinct and identifiable, non-transitory computer readable medium or computer software unit that is executed by the processor 102 and configured to perform the synchronization and alignment process to generate the synchronized point cloud 150, as well as the upsampling of the point cloud, and object registration as described herein.

Referring now to FIGS. 1, 1A, 2, 5, 5A and 6, in one aspect, the intensity upsampling module 104 is configured to generate a first upsampled 3D point cloud 150A based on the synchronized point cloud 150 generated by the alignment module 105 and the electro-optical intensity data of the electro-optical pixels within the synchronized point cloud 150 as a first stage of the upsampling process. As can be seen in FIG. 5, the synchronized point cloud 150 is illustrated as a matrix of electro-optical pixels 505, some of which have no depth value, while other electro-optical pixels have an assigned depth value based on the alignment/synchronization process described herein. The mix of electro-optical pixels without depth values and electro-optical pixels with assigned depth values is due to the relative resolution differences between the 3D point cloud 109 and the 2D image 108. As noted previously, the 2D image 108 generally has a higher resolution relative to the 3D point cloud 109 (see FIG. 4, for example). Thus, some of the electro-optical pixels within the synchronized point cloud 150 do not have an assigned depth value because the electro-optical pixel in the 2D image 108 does not have a corresponding point within the 3D point cloud 109.

In one aspect, the intensity upsampling module 104 is configured to interpolate depth values for the electro-optical pixels in the synchronized point cloud 150 that do not have an assigned depth value (e.g., such as the currently processed electro-optical pixel 501). In one aspect, for each currently processed electro-optical pixel 501, the intensity upsampling module 104 is configured to define a predefined upsampling window 502 around the currently processed electro-optical pixel 501. In one aspect, the intensity upsampling module 104 is further configured to interpolate the depth value to be assigned to the currently processed electro-optical 501 based on the assigned depth values of neighboring electro-optical pixels with depth values (e.g. neighboring points 161) that are located within the predefined upsampling window 502. In one aspect, the size of the predefined upsampling window 502 is determined by the resolution difference between the 2D image 108 and the 3D point cloud 109. For example, as shown in FIG. 5, the predefined upsampling window is about 5 electro-optical pixels wide and about 5 electro-optical pixels long, which is sufficiently large enough to include about 4 electro-optical pixels with assigned depth values (e.g., neighboring points 161) near the currently processed electro-optical pixel 501. In other aspects, the predefined upsampling window 502 can be any suitable size. The intensity upsampling module 104 is configured to interpolate the depth value of the currently processed electro-optical pixel 501 based on the neighboring points 161 within the upsampling window 502 with assigned depth values. In one aspect, this can be performed by the intensity upsampling module 104 for each electro-optical pixel without an assigned depth value within the first synchronized point cloud 150 to form the first upsampling point cloud 150A having the same resolution and density as the 2D image 108.

It is further noted that the synchronized point cloud 150 may include one or more "holes" or "gaps" within the synchronized point cloud 150 which may hinder the interpolation process for generating the upsampled point cloud 150A. In one aspect, these "holes" within the first upsampled point cloud 150A are manifested as missing depth values for electro-optical pixels within the first upsampled point cloud 150A. The missing depth values may occur in the first upsampled point cloud 150A for a multitude of reasons such as, for example, light reflection, noise (for example, when measuring objects in space) or areas of shadow and low detail. As shown in FIG. 5A, an example of a point cloud 109 with missing points is shown. In one aspect, the missing depth values in the point cloud 109 are shown as holes in the point cloud 109 caused by, for example, reflections of light. It may not be known whether the currently processed electro-optical pixel 501 within the synchronized point cloud 150 is actually non-existent or not detected due to noise (e.g., light reflections, noise, areas of shadow and low detail). In order to determine whether the currently processed electro-optical pixel 501 actually represents a non-existent point or if the currently processed electro-optical pixel 501 was not detected due to noise, in one aspect, the intensity upsampling module 104 is configured to also interpolate depth values for the currently processed electro-optical pixel 501 based on the electro-optical intensity of the currently processed electro-optical pixel 501 along with the electro-optical intensities of neighboring points 161 to backfill the depth value of the currently processed electro-optical pixel.

Referring now to FIG. 6, in one aspect, the intensity upsampling module 104 is configured to identify the currently processed electro-optical pixel 501 (without a depth value, e.g., a missing point) within the synchronized point cloud 150 (e.g. in which a missing point(s) or an electro-optical pixel(s) without a depth value are identified), as well as a neighborhood window 601 (including neighboring points 161) near the currently processed electro-optical pixel 501 within the synchronized point cloud 150. In one aspect, the size of the neighborhood window 601 is the same size as the predefined upsampling window 502. However, in other aspects, the neighborhood window 601 can be larger or smaller than the predefined upsampling window 502 depending on the computational or power usage limitations of the processor 102. In other aspects, the neighborhood window 601 can have any suitable size and have any suitable number of neighboring points 161 within the neighborhood window 601.

In one aspect, the intensity upsampling module 104 is further configured to determine the electro-optical intensity of neighboring points 161 within the neighborhood window 601 within the synchronized point cloud 150. If the electro-optical intensities of the neighboring points 161 are substantially similar to the electro-optical intensity of the currently processed electro-optical pixel 501 (e.g., by matching a predetermined intensity threshold), then the intensity upsampling module 104 is configured to determine that the neighboring points 161 within the neighborhood window 501 and the currently processed electro-optical pixel 501 are likely to be disposed along the same surface and should have substantially similar depth values (e.g., the depth value for the neighboring points 161 contributes to the generation of the depth value for the currently processed electro-optical pixel 501). In one aspect, the intensity upsampling module 104 fills the currently processed electro-optical pixel 501 with a depth filled point 501A (e.g., a filler point). The intensity upsampling module 104 also is configured to assign a depth value to the depth filled point 501A using the depth information from depth values in the synchronized point cloud 150 corresponding with the neighboring points 161 where the neighboring points 161 have electro-optical intensities that correspond with an intensity of the currently processed electro-optical pixel 501 in the synchronized point cloud 150. If the electro-optical intensities of the neighboring points 161 are not close to the electro-optical intensity of the currently processed electro-optical pixel 501, according to a predetermined electro-optical intensity threshold as discussed in greater detail below, then the depth information should not be interpolated in the upsampling process and the intensity upsampling module 104 is configured to repeat the process with a different currently processed electro-optical pixel 501. Based on the electro-optical intensities of the neighboring points 161, the interpolated depth value of the currently processed electro-optical pixel 501 is determined based on the depth value of the neighboring points 161 as described below.

In one aspect, the intensity upsampling process performed by the intensity upsampling module 105 can be expressed as follows. For each currently processed electro-optical pixel 501 at coordinate (i,j) (of the first upsampled point cloud 150A) without a depth value (expressed as $d_{ij}$), the intensity upsampling module 104 is configured to check the depth value of the neighboring points 161 (expressed as $d_{nbr(i,j)}$) within the neighborhood window 601. The intensity upsampling module 104 is also configured to determine the electro-optical intensity (expressed as $I_{ij}$) of the currently processed electro-optical pixel 501, as well as the electro-optical intensities of the neighboring points 161 (expressed as $I_{nbr(i,j)}$). If the intensity upsampling module 104 determines that the following equation is true:

$$|I_{ij} - I_{nbr(i,j)}| < I_{thresh}$$

where $I_{thresh}$ is any suitable predetermined electro-optical intensity threshold, then the intensity upsampling module 104 is configured to determine that the currently processed electro-optical pixel 501 is substantially on the same surface as the neighboring point 161 and assigns the currently processed electro-optical pixel 501 an interpolated depth value based on the depth value of the neighboring point 161.

In one aspect, where multiple neighboring points 161 within the neighborhood window 501 satisfy the condition $|I_{ij} - I_{nbr(i,j)}| < I_{thresh}$, the determination of whether the currently processed electro-optical pixel 501 is disposed substantially on the same surface as the neighboring points 161 is determined based on the intensity upsampling module 104 assigning a weight to each neighboring point 161. The weighting may be based on, for example, the distance between the currently processed electro-optical pixel 501 and the neighboring points 161 on the image plane, as well as the difference in electro-optical intensity between the two corresponding points. Therefore, in one aspect, a weight for the depth value of each neighboring point 161 is assigned inversely proportional to the distance between the currently processed electro-optical pixel 501 and the neighboring points 161 and the difference in intensity between the currently processed electro-optical pixel 501 and the respective neighboring pixel 161. The weight for the depth value of the neighboring point 161 may be expressed as:

$$\omega_{p,q} = \frac{1}{|[i-p \ \ j-q]| \cdot |I_{ij} - I_{pq} + \varepsilon|}$$

where (p,q) is the pixel location of the neighboring point 161 and $\varepsilon$ is a small number so that the electro-optical intensity of the neighboring point 161 is the same as the currently processed electro-optical pixel 501. In one aspect, the final depth value assigned to the currently processed electro-optical pixel 501 (e.g., $d_{ij}$) is determined by the intensity upsampling module 104 based on the following equation:

$$d_{ij} = \frac{1}{\sum \omega_{pq}} \left( \sum (\omega_{pq} \cdot d_{pq}) \right)$$

where $d_{ij}$ is the depth value of the currently processed electro-optical pixel 501 at coordinates (i,j) and $d_{pq}$ is the depth value of the neighboring point at pixel location (p,q).

In one aspect, the intensity upsampling module 104 is configured to assign the currently processed electro-optical pixel 501 the depth value $d_{ij}$, forming the depth filled point 501A. When all of the currently processed electro-optical pixels 501 are assigned a depth value $d_{ij}$, the intensity upsampling module 104 forms the first upsampled 3D point cloud 150A, based on the depth values in the synchronized point cloud 150 that correspond with neighboring points 161 in the 2D image 108 that have intensities that are substantially similar to the electro-optical intensity of each of the currently processed electro-optical pixel 501 (see block 204 of FIG. 2).

In one aspect, it should be understood that the intensity upsampling module 104 is a physical component that is connected to and is part of the processor 102. However, in other aspects, it should be understood that the intensity upsampling module 104 is a distinct and identifiable, non-transitory computer readable medium or computer software unit that is executed by the processor 102 and configured to generate the first upsampled point cloud 150A.

Referring now to FIGS. 1-1A, 2, 7 and 8, in one aspect, the entropy upsampling module 103 is configured to generate a second upsampled 3D point cloud 150B based on the first upsampled 3D point cloud 150A and the entropy data of the 2D image 108 utilizing a tiered second stage of the upsampling process. In one aspect, the entropy data of the 2D image 108 is the measure of variance in pixel levels of an electro-optical pixel within the 2D image 108 relative to its neighboring pixels. For example, the entropy of an image can be represented as the degree of change or noise between one pixel and its neighboring pixels. In one aspect, regions with relatively low entropy represent regions of substantially uniform surfaces or smooth features. Regions of an image with high entropy represents regions of substantial variation between neighboring pixels within an image, which represents high noise and/or high variability in surface (e.g. resulting in an irregular surface). An entropy image 701 of a 2D image 108 is shown in FIG. 7.

In one aspect, the entropy upsampling module 103 is configured to determine at least one local area 800 of the first upsampled 3D point cloud 150A (see block 205 of FIG. 2). In one aspect, the entropy upsampling module 103 is configured to upsample the first upsampled 3D point cloud 150A by determining, with the entropy upsampling module 103, the entropies of portions of the 2D image 108 corresponding to the local area 800. In one aspect, as shown in FIG. 8, the local area 800 is a set of neighboring points 801 around an entropy upsampling point 802. In one aspect, in order to reduce the time complexity of the 3D registration process, the entropy upsampling point 802 is upsampled based on a limited number of neighboring points 801, for example, the neighboring points 801 located diagonally with respect to the entropy upsampling point 802. Entropy upsampling is more efficient with a limited number of neighboring points 801 because this will reduce the amount of computation necessary by the entropy upsampling module 103 for upsampling the entropy upsampling point 802. However, in other aspects, the entropy upsampled point 802 may be upsampled with any suitable number of neighboring points within the local area 800. In one aspect, the neighboring points 801 can include, for example, interpolated points such as, for example, the depth filled point 501A as described herein. In one aspect, the entropy upsampling module 103 is configured to determine the entropy data in a portion of the 2D image 108 corresponding to the neighboring points 801 (including the depth filled point 501A) within the local area 800 (see block 206 of FIG. 2). In one aspect, the entropy upsampling module 103 is further configured to upsample the entropy upsampled point 802 by adding, with the entropy upsampling module 105, at least one point to the local area 800 of the first upsampled 3D point cloud 150A based on the entropies of the pixels in the 2D image 108 that correspond to the local area 800 and a scaled entropy threshold (e.g. providing a different upsampling method depending on the entropy of the 2D image 108 corresponding to the local area 800 and providing a tiered upsampling process).

In one aspect, if the entropy upsampling module 103 determines that the entropy within local area 800 is too high, then an estimate of the depth value for the entropy upsampled pixel 802 based on the neighboring points 801 within the local area 800 may not be performed accurately because the depth value differences of the entropy upsampled pixel 802 and the neighboring points 801 may be too great given the high entropy. In those cases, the entropy upsampled point 802 is not upsampled in high entropy areas. Thus, where the entropy of local area 800 is greater than a suitable threshold for high entropy, then the entropy upsampled point 802 at coordinates (i,j) is discarded.

In one aspect, if the entropy upsampling module 103 determines that the entropy within the local area 800 is low or does not exceed a predetermined threshold for entropy, then the entropy upsampling module 103 determines that the local area 800 corresponds to a substantially smooth surface that can be reliably estimated based on the neighboring points 801 (including, for example, depth filled point 501A) by averaging the entropy (see block 207 of FIG. 2). Thus, where the entropy of local area 800 is lower than a suitable threshold for low entropy, then the entropy upsampling module 103 assigns a depth value ($d_{ij}$) to the entropy upsampled pixel 802 according to the following equation:

$$d_{ij} = \text{mean}(d_{pq})$$

In one aspect, if the entropy upsampling module determines that the entropy within the local area 800 is within a predetermined medium range according to a predetermined threshold, then each of the neighboring points 801 (including, for example, depth filled point 501A) selectively contributes to a weight based on two factors (similar to the weighting factors employed by the intensity upsampling module) based on the distance between the corresponding points on the image plane 130 and the intensity difference between the two corresponding points (see block 207 of FIG. 2). Thus, the entropy upsampling module 103 assigns a depth value ($d_{ij}$) to the entropy upsampled point 802 based on the following equation:

$$d_{ij} = \frac{1}{\sum \omega_{pq}} \left( \sum (\omega_{pq} \cdot d_{pq}) \right) \text{ where } \omega_{p,q} = \frac{1}{\|[i-p \ j-q]\| \cdot |I_{ij} - I_{pq} + \varepsilon|}$$

In one aspect, the entropy upsampling module 103 is configured to output a second upsampled 3D point cloud 150B which can be employed by 3D registration module 117 for improved 3D registration with a known 3D model (see block 208 of FIG. 2). The second upsampled 3D point cloud 150B has greater point cloud density and resolution as well as greater 3D registration accuracy relative to the original 3D point cloud 109 detected by the 3D imaging sensor 111 and the first upsampled 3D point cloud 150A (without entropy upsampling) as shown in FIG. 10. The second upsampled 3D point cloud 150B is also efficiently generated by the processor 102 to provide for computationally efficient upsampling that can be performed in substantially real time. The second upsampled 3D point cloud 150B, with greater resolution and fewer missing holes or gaps within the 3D point cloud will also result in more accurate 3D registration by 3D registration module 117.

In one aspect, it should be understood that the entropy upsampling module 105 and the 3D registration module 117 are physical components that are connected to and are part of the processor 102. However, in other aspects, it should be understood that the entropy upsampling module 105 and the 3D registration module 117 are distinct and identifiable, non-transitory computer readable medium or computer software units that are executed by the processor 102 and configured to generate the second upsampled point cloud 150B.

Referring now to FIG. 9, an exemplary flow diagram of the two staged upsampling process is shown. At block 901, the alignment module 105 receives the 2D image 108 and the 3D point cloud 109 and, in combination with calibration data, aligns or synchronizes the 2D image 108 and the 3D point cloud 109 to form a synchronized point cloud 150 (see also block 201 of FIG. 2). At block 902, in one aspect, the intensity upsampling module is configured to identify at least one currently processed electro-optical pixel 501 without an assigned depth value 501 in the synchronized point cloud 150 (see block 202). The intensity upsampling module 104 is further configured to determine the intensity of neighboring pixels 161 in the electro-optical data of the synchronized point cloud 150 corresponding to the neighboring areas of the currently processed electro-optical pixel 501 in the synchronized point cloud 150 (see block 203 of FIG. 2). The intensity upsampling module 104 is further configured to assign a depth value to the currently processed electro-optical pixel 501 in the synchronized point cloud 150 to form the first upsampled 3D point cloud 150A. At block 903, the entropy upsampling module 103 is configured to determine the local area 800 of the first upsampled 3D point cloud 150A and determine the entropies of the electro-optical pixels in the 2D image 108 that correspond to the local area 800 of the first upsampled point cloud 150A (see blocks 205 and 206 of FIG. 2). At block 904, the entropy upsampling module 103 is further configured to upsample the entropy upsampled point 802 in the local area 800 of the first upsampled 3D point cloud 150 based on the entropies of the electro-optical pixels in the 2D image 108 that correspond to the neighboring points 801 (including the depth filled point 501A) of the local area 800 of the first upsampled 3D point cloud 150A (see block 207). The entropy upsampling module 103 is further configured to form the second upsampled 3D point cloud 150B. At block 905, the 3D registration module 117 is configured to register the second upsampled 3D point cloud 150 with a known 3D model (see block 208).

Referring now to FIG. 10, an example of the results of the second upsampled 3D point cloud 150B is shown in comparison with the 3D point cloud 109 generated by the point cloud module 106. As shown in FIG. 10, the 3D point cloud 109 has multiple regions with missing depth values, represented as holes or gaps within the 3D point cloud 109. In comparison, the second upsampled 3D point cloud 150B is visibly denser and has fewer gaps or holes within the second upsampled 3D point cloud 150B as a result of the two stage upsampling process as described herein. Because the second upsampled 3D point cloud 150B has fewer gaps and holes in the point cloud, as well as greater resolution due to the upsampling process as described herein, the second upsampled 3D point cloud 150 will result in more accurate 3D registration.

Referring now to FIG. 11 and Tables 1-3, the evaluation of 3D registration performance between the 3D point cloud 109, an upsampled point cloud without entropy upsampling (e.g. first upsampling point cloud 150A) and the second upsampled 3D point cloud 150B (with entropy upsampling) is shown. In one aspect, the Iterative Closest Point (ICP) method with the ground truth of object pose (position and orientation) is employed to evaluate the 3D registration performance of each model. Referring now to FIG. 11, in one aspect, the Iterative Closest Point is performed by manually moving and rotating 1101 a predetermined 3D model 1100 and an input point cloud (e.g. the 3D point cloud 109, the first upsampled 3D point cloud 150A and the second upsampled 3D point cloud 150B) to obtain the ground truth homogeneous transform, $H_{GT}$. The input point cloud is initialized at an initial pose, $H_{INIT}$ 1102. In one aspect, by running ICP, the input point cloud is automatically aligned with the predetermined 3D model. This alignment process by ICP 1103 provides a homogeneous transform, $H_{ICP}$. Then the error homogeneous transform is calculated 1104 by the following equation:

$$H_{ERROR} = H_{INIT} H_{ICP} (H_{GT})^{-1}.$$

If $H_{ERROR}$ is the identity matrix, the registration has no error. In one aspect, tests on three different point cloud sets are performed depending on the range from the EO/LIDAR sensors to the target object, specifically, SET 1 with ~13 meter range, SET 2 with ~9 meter range, and SET 3 with ~5 meter range. It is noted that the given ranges for Tables 1-3 are exemplary only, and other ranges may be used. Tables 1-3 show the registration errors in translation and orientation (of each angular component). As seen in Tables 1-3, the entropy-based approach of the present disclosure shows the lowest registration errors, and especially, the yaw angles were highly improved compared with those of the original point clouds

TABLE 1

| SET (at ~13 m range) | | | | |
|---|---|---|---|---|
| | Translation (m) | Pitch (deg) | Yaw (deg) | Roll (deg) |
| Original point cloud | ~0.0603 | ~2.29 | ~-17.49 | ~-3.34 |
| EO-LIDAR fusion without entropy test | ~0.0177 | ~0.65 | ~-2.71 | ~-2.19 |
| EO-LIDAR fusion with entropy test | ~0.0171 | ~-0.56 | ~0.06 | ~-1.99 |

TABLE 2

| SET 2 (at ~9 m range) | | | | |
|---|---|---|---|---|
| | Translation (m) | Pitch (deg) | Yaw (deg) | Roll (deg) |
| Original point cloud | ~0.1205 | ~0.25 | ~15.54 | ~0.63 |
| EO-LIDAR fusion without entropy test | ~0.0438 | ~0.80 | ~3.82 | ~0.86 |
| EO-LIDAR fusion with entropy test | ~0.0332 | ~1.39 | ~1.42 | ~0.86 |

TABLE 3

| SET 3 (at ~5 m rage) | | | | |
|---|---|---|---|---|
| | Translation (m) | Pitch (deg) | Yaw (deg) | Roll (deg) |
| Original point cloud | ~0.1 | ~-4.51 | ~17.97 | ~2.19 |
| EO-LIDAR fusion without entropy test | ~0.0627 | ~-4.44 | ~8.58 | ~-0.77 |
| EO-LIDAR fusion with entropy test | ~0.0542 | ~-4.17 | ~7.36 | ~-0.32 |

Examples of the disclosure may be described in the context of a spacecraft 1202 as shown in FIG. 12. As shown in FIG. 12, the spacecraft 1202 may include an airframe 1218 with a plurality of high-level systems and an interior 1222. Examples of high-level systems, which are distributed throughout the spacecraft, include one or more of a propulsion system 1224, an electrical power system 1226, a hydraulic system 1228, and an environmental system 1230 and the satellite communications relay system 1231. In one aspect, the spacecraft 1202 also includes the image processing system 101 and the 2D imaging system 110 and 3D imaging system 111. In one aspect, as shown in FIG. 12, the spacecraft 1202 is configured to employ the imaging processing system 101, including the 2D imaging system 110 and 3D imaging system 111, for use in proximity maneuvering or docking with a docking port (e.g., the object 116 within the scene 115). In other aspects, the present disclosure may be employed with autonomous terrestrial/maritime vehicles, automated machinery or other applications where one component is mated to another component under the guidance of 3D registration.

In accordance with one or more aspects of the present disclosure, the following is provided:

A1. A method for three-dimensional point cloud registration, the method includes generating, with a processor, a three-dimensional point cloud of a scanned object using data received from a three-dimensional imaging sensor and storing the three-dimensional point cloud in a first memory location, generating, with the processor, a two-dimensional image of the scanned object using data received from a two-dimensional imaging sensor and storing the two-dimensional image in a second memory location, comparing the three-dimensional point cloud and the two-dimensional image, with the processor, and aligning the three-dimensional point cloud with the two-dimensional image according to at least three common points that are common to both the three-dimensional point cloud and the two-dimensional image, generating, with the processor, a first upsampled three-dimensional point cloud by identifying, with the processor, at least one missing point in the three-dimensional point cloud, determining, with the processor, an intensity of neighboring pixels in the two-dimensional image neighboring the at least one missing point in the three-dimensional point cloud, and filling, with the processor, the at least one missing point in the three-dimensional point cloud with a filler point using depth information from depth values in the three-dimensional point cloud that correspond with the neighboring pixels in the two-dimensional image where the neighboring pixels have intensities that correspond with an intensity of a point in the two-dimensional image associated with a respective missing point in the three-dimensional point cloud, generating, with the processor, a second upsampled three-dimensional point cloud by determining, with the processor, at least one local area of the first upsampled three-dimensional point cloud, determining, with the processor, entropies of pixels in the two-dimensional image that correspond with the at least one local area of the first upsampled three-dimensional point cloud, and adding, with the processor, at least one point to the at least one local area of the first upsampled three-dimensional point cloud based on the entropies of pixels in the two-dimensional image that correspond with the at least one local area and a scaled entropy threshold, and registering, with the processor, the second upsampled three-dimensional point cloud with a predetermined three-dimensional model of the scanned object.

A2. The method of paragraph A1, wherein the at least one missing point is filled with the filler point when the intensities of the neighboring pixels and the intensity of the point in the two-dimensional image associated with the respective missing point in the three-dimensional point cloud match within a predetermined threshold.

A3. The method of paragraph A1, wherein filling the at least one missing point in the three-dimensional point cloud with the filler point further comprises assigning a weight for the neighboring pixels in the two-dimensional image.

A4. The method of paragraph A3, further comprising determining the weight for a respective neighboring pixel based on a distance between the at least one missing point and the respective neighboring pixel and a difference in intensity between the at least one missing point and the respective neighboring pixel.

A5. The method of paragraph A4, wherein the weight for the respective neighboring pixel is inversely proportional to the distance between the at least one missing point and the respective neighboring pixel and the difference in intensity between the at least one missing point and the respective neighboring pixel.

A6. The method of paragraph A1, wherein generating the first upsampled three-dimensional point cloud further includes assigning depth values to points in the two-dimensional image based on corresponding points in the three-dimensional point cloud, and interpolating depth values for pixels of the two-dimensional image that do not have corresponding points in the three-dimensional point cloud.

A7. The method of paragraph A6, wherein interpolating the depth values for pixels of the two dimensional point cloud occurs in a predefined upsampling window around a point in the two-dimensional image having a known depth.

A8. The method of paragraph A7, further comprising determining a size of the predefined upsampling window based on a difference in resolution of the three-dimensional point cloud and the two-dimensional image.

A9. The method of paragraph A1, wherein the at least one point added to the at least one local area of the first upsampled three-dimensional point cloud is located diagonally to pixels having a known depth.

A10. The method of paragraph A1, wherein the scaled entropy threshold includes a first threshold where upsampling does not occur if the entropies of pixels in the two-dimensional image that correspond with the at least one local area exceeds the first threshold, a second threshold where a mean upsampling occurs if the entropies of pixels in the two-dimensional image that correspond with the at least one local area are less than the second threshold, and a weighted upsampling occurs if the entropies of pixels in the two-dimensional image that correspond with the at least one local area is between the first and second thresholds.

B1. An apparatus for three-dimensional point cloud registration, the apparatus including a three-dimensional imaging sensor, a two-dimensional imaging sensor, and a processor connected to both the three-dimensional sensor and the two-dimensional sensor, the processor being configured to generate a three-dimensional point cloud of a scanned object using data received from the three-dimensional imaging sensor and store the three-dimensional point cloud in a first memory location, generate a two-dimensional image of the scanned object using data received from the two-dimensional imaging sensor and store the two-dimensional image in a second memory location, compare the three-dimensional point cloud and the two-dimensional image and align the three-dimensional point cloud with the two-dimensional image according to at least one common point that is common to both the three-dimensional point cloud and the two-dimensional image, generate a first upsampled three-dimensional point cloud by identifying at least one missing point in the three-dimensional point cloud, determining an intensity of neighboring pixels in the two-dimensional image neighboring the at least one missing point in the three-dimensional point cloud, and filling the at least one missing point in the three-dimensional point cloud with a filler point using depth information from depth values in the three-dimensional point cloud that correspond with the neighboring pixels in the two-dimensional image where the neighboring pixels have intensities that correspond with an intensity of a point in the two-dimensional image associated with a respective missing point in the three-dimensional point cloud, generate a second upsampled three-dimensional point cloud by determining at least one local area of the first upsampled three-dimensional point cloud, determining entropies of pixels in the two-dimensional image that correspond with the at least one local area of the first upsampled three-dimensional point cloud, and adding at least one point to the at least one local area of the first upsampled three-dimensional point cloud based on the entropies of pixels in the two-dimensional image that correspond with the at least one local area and a scaled entropy threshold, and registering the second upsampled three-dimensional point cloud with a predetermined three-dimensional model of the scanned object.

B2. The apparatus of paragraph B1, wherein the processor is configured to fill the at least one missing point with the filler point when the intensities of the neighboring pixels and the intensity of the point in the two-dimensional image associated with the respective missing point in the three-dimensional point cloud match within a predetermined threshold.

B3. The apparatus of paragraph B1, wherein filling the at least one missing point in the three-dimensional point cloud with the filler point further comprises assigning a weight for the neighboring pixels in the two-dimensional image.

B4. The apparatus of paragraph B3, wherein the processor is configured to determine the weight for a respective neighboring pixel based on a distance between the at least one missing point and the respective neighboring pixel and a difference in intensity between the at least one missing point and the respective neighboring pixel.

B5. The apparatus of paragraph B4, wherein the weight for the respective neighboring pixel is inversely proportional to the distance between the at least one missing point and the respective neighboring pixel and the difference in intensity between the at least one missing point and the respective neighboring pixel.

B6. The apparatus of paragraph B1, wherein the processor is configure to, when generating the first upsampled three-dimensional point cloud, assign depth values to points in the two-dimensional image based on corresponding points in the three-dimensional point cloud, and interpolate depth values for pixels of the two-dimensional image that do not have corresponding points in the three-dimensional point cloud.

B7. The apparatus of paragraph B6, wherein the processor is configured to interpolate the depth values for pixels of the two dimensional point cloud in a predefined upsampling window around a point in the two-dimensional image having a known depth.

B8. The apparatus of paragraph B7, wherein the processor is configured to determine a size of the predefined upsampling window based on a difference in resolution of the three-dimensional point cloud and the two-dimensional image.

B9. The apparatus of paragraph B1, wherein the at least one point added to the at least one local area of the first upsampled three-dimensional point cloud is located diagonally to pixels having a known depth.

B10. The apparatus of paragraph B1, wherein the scaled entropy threshold includes a first threshold where upsampling does not occur if the entropies of pixels in the two-dimensional image that correspond with the at least one local area exceeds the first threshold, a second threshold where a mean upsampling occurs if the entropies of pixels in the two-dimensional image that correspond with the at least one local area are less than the second threshold, and a weighted upsampling occurs if the entropies of pixels in the two-dimensional image that correspond with the at least one local area is between the first and second thresholds.

C1. A non-transitory computer readable medium with instructions stored thereon, that when executed by a processor, are operable for performing a method for three-dimensional point cloud registration, the method includes generating a three-dimensional point cloud of a scanned object using data received from a three-dimensional imaging sensor and storing the three-dimensional point cloud in a first memory location, generating a two-dimensional image of the scanned object using data received from a two-dimensional imaging sensor and storing the two-dimensional image in a second memory location, comparing the three-dimensional point cloud and the two-dimensional image and aligning the three-dimensional point cloud with the two-dimensional image according to at least one common point that is common to both the three-dimensional point cloud and the two-dimensional image, generating a first upsampled three-dimensional point cloud by identifying, with the processor, at least one missing point in the three-dimensional point cloud, determining, with the processor, an intensity of neighboring pixels in the two-dimensional image neighboring the at least one missing point in the three-dimensional point cloud, and filling, with the processor, the at least one missing point in the three-dimensional point cloud with a filler point using depth information from depth values in the three-dimensional point cloud that correspond with the neighboring pixels in the two-dimensional image where the neighboring pixels have intensities that correspond with an intensity of a point in the two-dimensional image associated with a respective missing point in the three-dimensional point cloud, generating a second upsampled three-dimensional point cloud by determining, with the processor, at least one local area of the first upsampled three-dimensional point cloud, determining, with the processor, entropies of pixels in the two-dimensional image that correspond with the at least one local area of the first upsampled three-dimensional point cloud, and adding, with the processor, at least one point to the at least one local area of the first upsampled three-dimensional point cloud based on the entropies of pixels in the two-dimensional image that correspond with the at least one local area and a scaled entropy threshold, and registering the second upsampled three-dimensional point cloud with a predetermined three-dimensional model of the scanned object.

C2. The non-transitory computer readable medium of paragraph C1, wherein the at least one missing point is filled with the filler point when the intensities of the neighboring pixels and the intensity of the point in the two-dimensional image associated with the respective missing point in the three-dimensional point cloud match within a predetermined threshold.

C3. The non-transitory computer readable medium of paragraph C1, wherein filling the at least one missing point in the three-dimensional point cloud with the filler point further comprises assigning a weight for the neighboring pixels in the two-dimensional image.

C4. The non-transitory computer readable medium of paragraph C3, further comprising determining the weight for a respective neighboring pixel based on a distance between the at least one missing point and the respective neighboring pixel and a difference in intensity between the at least one missing point and the respective neighboring pixel.

C5. The non-transitory computer readable medium of paragraph C4, wherein the weight for the respective neighboring pixel is inversely proportional to the distance between the at least one missing point and the respective neighboring pixel and the difference in intensity between the at least one missing point and the respective neighboring pixel.

C6. The non-transitory computer readable medium of paragraph C1, wherein generating the first upsampled three-dimensional point cloud further includes assigning depth values to points in the two-dimensional image based on corresponding points in the three-dimensional point cloud, and interpolating depth values for pixels of the two-dimensional image that do not have corresponding points in the three-dimensional point cloud.

C7. The non-transitory computer readable medium of paragraph C6, wherein interpolating the depth values for pixels of the two dimensional point cloud occurs in a predefined upsampling window around a point in the two-dimensional image having a known depth.

C8. The non-transitory computer readable medium of paragraph C7, further comprising determining a size of the predefined upsampling window based on a difference in resolution of the three-dimensional point cloud and the two-dimensional image.

C9. The non-transitory computer readable medium of paragraph C1, wherein the at least one point added to the at least one local area of the first upsampled three-dimensional point cloud is located diagonally to pixels having a known depth.

C10. The non-transitory computer readable medium of paragraph C1, wherein the scaled entropy threshold includes a first threshold where upsampling does not occur if the entropies of pixels in the two-dimensional image that correspond with the at least one local area exceeds the first threshold, a second threshold where a mean upsampling occurs if the entropies of pixels in the two-dimensional image that correspond with the at least one local area are less than the second threshold, and a weighted upsampling occurs if the entropies of pixels in the two-dimensional image that correspond with the at least one local area is between the first and second thresholds.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A method for three-dimensional point cloud registration, the method comprising:
    generating, with a processor, a three-dimensional point cloud of a scanned object using data received from a three-dimensional imaging sensor and storing the three-dimensional point cloud in a first memory location;
    generating, with the processor, a two-dimensional image of the scanned object using data received from a two-dimensional imaging sensor and storing the two-dimensional image in a second memory location;
    comparing the three-dimensional point cloud and the two-dimensional image, with the processor, and aligning the three-dimensional point cloud with the two-dimensional image according to at least three common points that are common to both the three-dimensional point cloud and the two-dimensional image;
    generating, with the processor, a first upsampled three-dimensional point cloud by
        identifying, with the processor, at least one missing point in the three-dimensional point cloud,
        determining, with the processor, an intensity of neighboring pixels in the two-dimensional image neighboring the at least one missing point in the three-dimensional point cloud, and
        filling, with the processor, the at least one missing point in the three-dimensional point cloud with a filler point using depth information from depth values in the three-dimensional point cloud that correspond with the neighboring pixels in the two-dimensional image where the neighboring pixels have intensities that correspond with an intensity of a point in the two-dimensional image associated with a respective missing point in the three-dimensional point cloud;
    generating, with the processor, a second upsampled three-dimensional point cloud by
        determining, with the processor, at least one local area of the first upsampled three-dimensional point cloud,
        determining, with the processor, entropies of pixels in the two-dimensional image that correspond with the at least one local area of the first upsampled three-dimensional point cloud, and
        adding, with the processor, at least one point to the at least one local area of the first upsampled three-dimensional point cloud based on the entropies of pixels in the two-dimensional image that correspond with the at least one local area and a scaled entropy threshold; and
    registering, with the processor, the second upsampled three-dimensional point cloud with a predetermined three-dimensional model of the scanned object.

2. The method of claim 1, wherein the at least one missing point is filled with the filler point when the intensities of the neighboring pixels and the intensity of the point in the two-dimensional image associated with the respective missing point in the three-dimensional point cloud match within a predetermined threshold.

3. The method of claim 1, wherein filling the at least one missing point in the three-dimensional point cloud with the filler point further comprises assigning a weight for the neighboring pixels in the two-dimensional image.

4. The method of claim 3, further comprising determining the weight for a respective neighboring pixel based on a distance between the at least one missing point and the respective neighboring pixel and a difference in intensity between the at least one missing point and the respective neighboring pixel.

5. The method of claim 1, wherein generating the first upsampled three-dimensional point cloud further comprises:
    assigning depth values to points in the two-dimensional image based on corresponding points in the three-dimensional point cloud; and
    interpolating depth values for pixels of the two-dimensional image that do not have corresponding points in the three-dimensional point cloud.

6. The method of claim 5, wherein interpolating the depth values for pixels of the two dimensional point cloud occurs in a predefined upsampling window around a point in the two-dimensional image having a known depth.

7. The method of claim 1, wherein the at least one point added to the at least one local area of the first upsampled three-dimensional point cloud is located diagonally to pixels having a known depth.

8. The method of claim 1, wherein the scaled entropy threshold includes:
    a first threshold where upsampling does not occur if the entropies of pixels in the two-dimensional image that correspond with the at least one local area exceeds the first threshold;
    a second threshold where a mean upsampling occurs if the entropies of pixels in the two-dimensional image that correspond with the at least one local area are less than the second threshold; and
    a weighted upsampling occurs if the entropies of pixels in the two-dimensional image that correspond with the at least one local area is between the first and second thresholds.

9. An apparatus for three-dimensional point cloud registration, the apparatus comprising:
    a three-dimensional imaging sensor;
    a two-dimensional imaging sensor; and
    a processor connected to both the three-dimensional sensor and the two-dimensional sensor, the processor being configured to:
    generate a three-dimensional point cloud of a scanned object using data received from the three-dimensional imaging sensor and store the three-dimensional point cloud in a first memory location;

generate a two-dimensional image of the scanned object using data received from the two-dimensional imaging sensor and store the two-dimensional image in a second memory location;

compare the three-dimensional point cloud and the two-dimensional image and align the three-dimensional point cloud with the two-dimensional image according to at least one common point that is common to both the three-dimensional point cloud and the two-dimensional image;

generate a first upsampled three-dimensional point cloud by identifying at least one missing point in the three-dimensional point cloud, determining an intensity of neighboring pixels in the two-dimensional image neighboring the at least one missing point in the three-dimensional point cloud, and filling the at least one missing point in the three-dimensional point cloud with a filler point using depth information from depth values in the three-dimensional point cloud that correspond with the neighboring pixels in the two-dimensional image where the neighboring pixels have intensities that correspond with an intensity of a point in the two-dimensional image associated with a respective missing point in the three-dimensional point cloud;

generate a second upsampled three-dimensional point cloud by determining at least one local area of the first upsampled three-dimensional point cloud, determining entropies of pixels in the two-dimensional image that correspond with the at least one local area of the first upsampled three-dimensional point cloud, and adding at least one point to the at least one local area of the first upsampled three-dimensional point cloud based on the entropies of pixels in the two-dimensional image that correspond with the at least one local area and a scaled entropy threshold; and registering the second upsampled three-dimensional point cloud with a predetermined three-dimensional model of the scanned object.

10. The apparatus of claim 9, wherein the processor is configured to fill the at least one missing point with the filler point when the intensities of the neighboring pixels and the intensity of the point in the two-dimensional image associated with the respective missing point in the three-dimensional point cloud match within a predetermined threshold.

11. The apparatus of claim 9, wherein filling the at least one missing point in the three-dimensional point cloud with the filler point further comprises assigning a weight for the neighboring pixels in the two-dimensional image.

12. The apparatus of claim 9, wherein the processor configured to, when generating the first upsampled three-dimensional point cloud, assign depth values to points in the two-dimensional image based on corresponding points in the three-dimensional point cloud; and interpolate depth values for pixels of the two-dimensional image that do not have corresponding points in the three-dimensional point cloud.

13. The apparatus of claim 12, wherein the processor is configured to interpolate the depth values for pixels of the two-dimensional image in a predefined upsampling window around a point in the two-dimensional image having a known depth.

14. The apparatus of claim 9, wherein the scaled entropy threshold includes:

a first threshold where upsampling does not occur if the entropies of pixels in the two-dimensional image that correspond with the at least one local area exceeds the first threshold;

a second threshold where a mean upsampling occurs if the entropies of pixels in the two-dimensional image that correspond with the at least one local area are less than the second threshold; and a weighted upsampling occurs if the entropies of pixels in the two-dimensional image that correspond with the at least one local area is between the first and second thresholds.

15. A non-transitory computer readable medium with instructions stored thereon, that when executed by a processor, are operable for performing a method for three-dimensional point cloud registration, the method comprising:

generating a three-dimensional point cloud of a scanned object using data received from a three-dimensional imaging sensor and storing the three-dimensional point cloud in a first memory location;

generating a two-dimensional image of the scanned object using data received from a two-dimensional imaging sensor and storing the two-dimensional image in a second memory location;

comparing the three-dimensional point cloud and the two-dimensional image and aligning the three-dimensional point cloud with the two-dimensional image according to at least one common point that is common to both the three-dimensional point cloud and the two-dimensional image;

generating a first upsampled three-dimensional point cloud by identifying, with the processor, at least one missing point in the three-dimensional point cloud, determining, with the processor, an intensity of neighboring pixels in the two-dimensional image neighboring the at least one missing point in the three-dimensional point cloud, and filling, with the processor, the at least one missing point in the three-dimensional point cloud with a filler point using depth information from depth values in the three-dimensional point cloud that correspond with the neighboring pixels in the two-dimensional image where the neighboring pixels have intensities that correspond with an intensity of a point in the two-dimensional image associated with a respective missing point in the three-dimensional point cloud;

generating a second upsampled three-dimensional point cloud by determining, with the processor, at least one local area of the first upsampled three-dimensional point cloud, determining, with the processor, entropies of pixels in the two-dimensional image that correspond with the at least one local area of the first upsampled three-dimensional point cloud, and adding, with the processor, at least one point to the at least one local area of the first upsampled three-dimensional point cloud based on the entropies of pixels in the two-dimensional image that correspond with the at least one local area and a scaled entropy threshold; and registering the second upsampled three-dimensional point cloud with a predetermined three-dimensional model of the scanned object.

16. The non-transitory computer readable medium of claim 15, wherein the at least one missing point is filled with the filler point when the intensities of the neighboring pixels and the intensity of the point in the two-dimensional image associated with the respective missing point in the three-dimensional point cloud match within a predetermined threshold.

17. The non-transitory computer readable medium of claim 15, wherein filling the at least one missing point in the three-dimensional point cloud with the filler point further comprises assigning a weight for the neighboring pixels in the two-dimensional image.

18. The non-transitory computer readable medium of claim 15, wherein generating the first upsampled three-dimensional point cloud further comprises:
   assigning depth values to points in the two-dimensional image based on corresponding points in the three-dimensional point cloud; and
   interpolating depth values for pixels of the two-dimensional image that do not have corresponding points in the three-dimensional point cloud.

19. The non-transitory computer readable medium of claim 18, wherein interpolating the depth values for pixels of the two dimensional point cloud occurs in a predefined upsampling window around a point in the two-dimensional image having a known depth.

20. The non-transitory computer readable medium of claim 15, wherein the scaled entropy threshold includes:
   a first threshold where upsampling does not occur if the entropies of pixels in the two-dimensional image that correspond with the at least one local area exceeds the first threshold;
   a second threshold where a mean upsampling occurs if the entropies of pixels in the two-dimensional image that correspond with the at least one local area are less than the second threshold; and
   a weighted upsampling occurs if the entropies of pixels in the two-dimensional image that correspond with the at least one local area is between the first and second thresholds.

* * * * *